United States Patent
Johri et al.

(10) Patent No.: US 12,267,118 B2
(45) Date of Patent: Apr. 1, 2025

(54) APPARATUS AND METHOD FOR SERVING CELL IDENTIFICATION

(71) Applicant: RAKUTEN SYMPHONY, INC., Tokyo (JP)

(72) Inventors: Prafull Johri, Madhya Pradesh (IN); Vinay Bhokare, Madhya Pradesh (IN); Prabal Bhardwaj, Madhya Pradesh (IN); Dharambir Bharti, Madhya Pradesh (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/637,800

(22) PCT Filed: Feb. 8, 2022

(86) PCT No.: PCT/US2022/015556
§ 371 (c)(1),
(2) Date: Feb. 24, 2022

(87) PCT Pub. No.: WO2023/154033
PCT Pub. Date: Aug. 17, 2023

(65) Prior Publication Data
US 2024/0039649 A1    Feb. 1, 2024

(51) Int. Cl.
*H04W 24/08*    (2009.01)
*H04B 17/318*   (2015.01)
*H04B 17/345*   (2015.01)

(52) U.S. Cl.
CPC ......... *H04B 17/328* (2023.05); *H04B 17/345* (2015.01); *H04W 24/08* (2013.01)

(58) Field of Classification Search
CPC ........ H04B 17/32; H04B 17/31; H04B 17/34; H04B 7/06; H04B 7/18; H04B 7/26; H04B 7/30; H04W 24/08; H04W 24/02; H04W 24/10; H04W 28/02; H04W 72/04; H04W 72/08; H04W 72/51; H04W 72/54; H04W 76/20; H04W 76/30; H04W 16/18; H04W 36/00; H04W 36/08; H04W 48/16
(Continued)

(56) References Cited

U.S. PATENT DOCUMENTS 9,781,752 B2 * 10/2017 Chaudhuri ............ H04L 5/0048
10,257,867 B2 * 4/2019 Chaudhuri ............ H04L 5/0048
(Continued)

*Primary Examiner* — Man U Phan
(74) *Attorney, Agent, or Firm* — HAUPTMAN HAM, LLP

(57) ABSTRACT

Method and apparatus for serving cell identification includes: receiving inputs that include geo-located data collected over a period for a plurality of cells in RAN; determining each cell included in each grid of a predetermined size based on the geo-located data; determining Received Signal Received Power (RSRP) values for each cell having the predetermined size; determining a median cell RSRP for each cell of a grid; determining from the geo-located data a number of data samples per cell for each grid having the predetermined size; determining a cell ranking for each of the cell in the grids having the predetermined size based on the number of data samples and the median cell RSRP; determining a highest-ranking cell in each grid based on the cell ranking; labeling the highest-ranking cell as a Main Server (MS); and labeling all other cells in a corresponding grid as a Non-Main Server (NS).

16 Claims, 14 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,510,106 | B2* | 11/2022 | Zeng | H04W 24/02 |
| 11,856,467 | B2* | 12/2023 | Koskela | H04B 7/0617 |
| 2007/0243881 | A1* | 10/2007 | Roskowski | H04W 24/00 |
| | | | | 455/456.1 |
| 2014/0094178 | A1* | 4/2014 | Eskicioglu | H04W 36/322 |
| | | | | 455/440 |
| 2015/0079989 | A1* | 3/2015 | Tambaram Kailasam | |
| | | | | H04W 36/0088 |
| | | | | 455/436 |
| 2021/0243623 | A1* | 8/2021 | Bodiga | H04W 24/08 |
| 2022/0110035 | A1* | 4/2022 | Liberg | G01S 5/14 |
| 2022/0322182 | A1* | 10/2022 | Lee | H04W 36/0061 |
| 2023/0080386 | A1* | 3/2023 | Zeng | H04W 52/241 |
| | | | | 455/419 |
| 2023/0269635 | A1* | 8/2023 | Xu | H04W 48/20 |
| | | | | 370/329 |
| 2024/0049092 | A1* | 2/2024 | Määttänen et al. | |
| | | | | H04B 7/18541 |

* cited by examiner

APPARATUS AND METHOD FOR SERVING CELL IDENTIFICATION

RELATED APPLICATIONS

The present application is a National Phase of International Application No. PCT/US2022/015556, filed Feb. 8, 2022.

BACKGROUND

A cellular network is a telecommunication system of mobile devices (e.g., mobile phone devices) that communicate by radio waves through a local antenna at a cellular base station (e.g., cell tower). The coverage area in which service is provided is divided into small geographical areas called "cells". Each cell is served by a separate low power multi-channel transceiver and antenna at the cell tower. Mobile devices within a cell communicate through that cell's antenna on multiple frequencies and on separate frequency channels assigned by the base station from a common pool of frequencies used by the cellular network.

A Radio Access Network (RAN) is part of the telecommunication system. The RAN implements radio access technology. RANs reside between devices such as a mobile phone, a computer, or any remotely controlled machine and provides connection with its Core Network (CN). Depending on the standard, mobile phones and other wireless connected devices are varyingly known as User Equipment (UE), terminal equipment, Mobile Station (MS), and the like.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features are arbitrarily increased or reduced for clarity of discussion.

DETAILED DESCRIPTION

Figure 1:
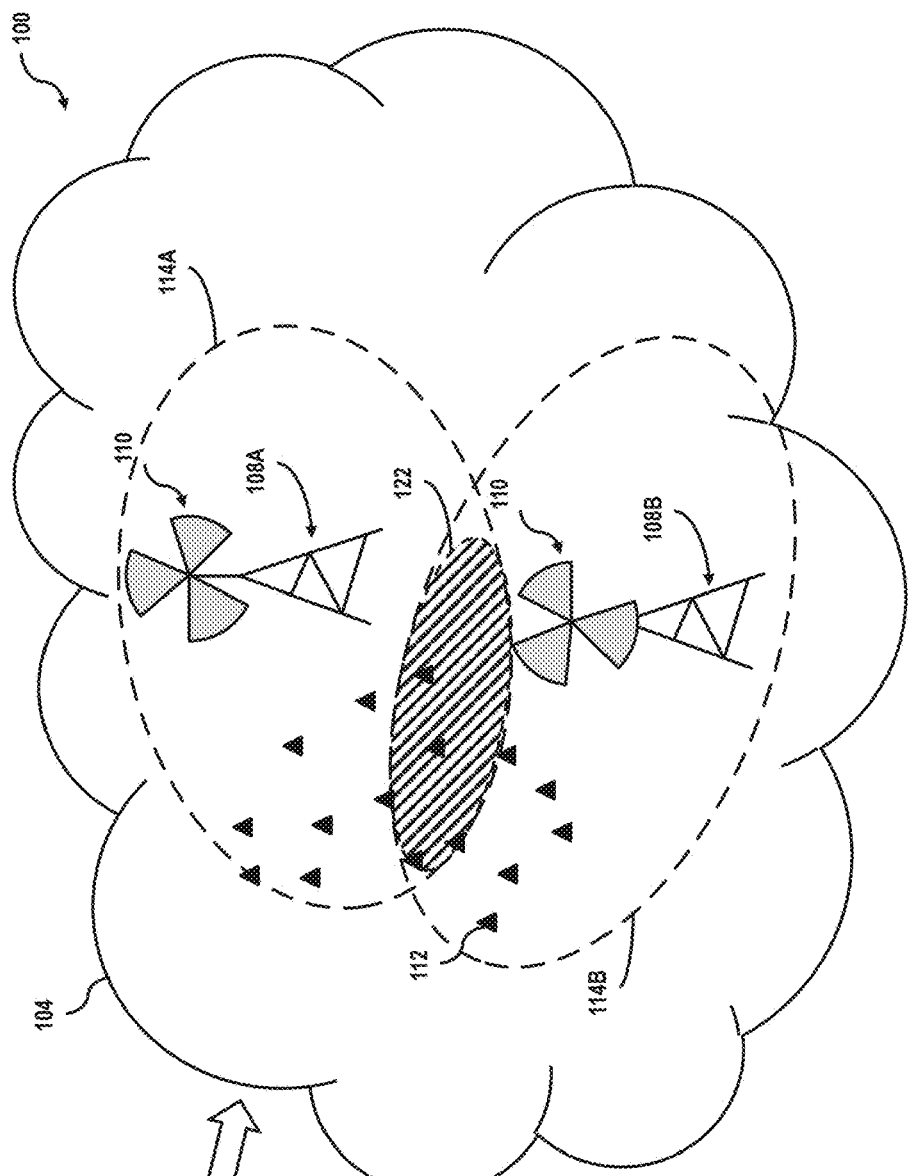
FIG. 1 is a diagrammatic representation of a Server Cell Identification (SCI) system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a system of one or more computers are configured to perform particular operations or actions by virtue of having software, firmware, hardware, or a combination of them installed on the system that in operation causes or cause the system to perform the actions. In some embodiments, one or more computer programs are configured to perform particular operations or actions by virtue of including instructions that, when executed by data processing apparatus, cause the apparatus to perform the actions. In some embodiments, an apparatus includes a processor and a memory having instructions stored thereon. In some embodiments, when executed by the processor, the instructions cause the apparatus to receive inputs that include geo-located data collected over a period for a plurality of cells in a Radio Access Network (RAN). In some embodiments, the instructions further cause the processor to determine each cell in the plurality of cells included in each grid in a plurality of grids of a predetermined size based on the geo-located data. In some embodiments, the instructions further cause the processor to determine Received Signal Received Power (RSRP) values for each cell of each grid based on the geo-located data. In some embodiments, the instructions further cause the processor to determine a median cell RSRP for each cell of a grid. In some embodiments, the instructions further cause the processor to determine from the geo-located data a number of data samples per cell for each grid. In some embodiments, the instructions further cause the processor to determine a cell ranking for each cell of each grid based on the number of data samples and the median cell RSRP. In some embodiments, the instructions further cause the processor to determine a highest-ranking cell in each grid based on the cell ranking. In some embodiments, the instructions further cause the processor to label the highest-ranking cell in each grid as a Main Server (MS). In some embodiments, the instructions further cause the processor to label all other cells in each grid as a Non-main Server (NS).

In some embodiments, the instructions further cause the processor to determine whether interference in a geographic area covered by two or more cells is internal or external. In some embodiments, the instructions further cause the processor to label the interference as internal interference when the two or more cells are operated by a same vendor. In some embodiments, the instructions further cause the processor to label the interference as external interference when the two or more cells are operated by a different vendor. In some embodiments, the instructions further cause the processor to, responsive to the internal interference in the geographic area, determine whether a MS cell RSRP is less than a first threshold. In some embodiments, the instructions further cause the processor to, responsive to the MS cell RSRP being less than the first threshold, label a grid MS as poor dominance. In some embodiments, the instructions further cause the processor to, responsive to the MS cell RSRP being greater than the first threshold, determining whether a difference between the MS cell RSRP and a NS RSRP is greater than a second threshold. The second threshold being smaller than the first threshold.

In some embodiments, RA network performance and capacity is improved through analysis of serving cell interference. In some embodiments, improving (Signal-to-Interference-plus-Noise Ratio) SINR/RSRQ through improving dominant (Main) Serving cell (MS) coverage and reducing Non (main) Serving cell (NS) coverage (e.g., overlap from sites that have a signal in a specific area but do not provide service). In some embodiments, analysis of serving cell interference further identifies a serving cell within a particular geographical area configured to provide the best coverage based on the RSRP of drive samples.

SINR is a quantity used to give theoretical upper bounds on channel capacity (or the rate of information transfer) in wireless communication systems. Analogous to the Signal-to-Noise Ratio (SNR) used often in wired communications systems, the SINR is defined as the power of a certain signal of interest divided by the sum of the interference power (from all the other interfering signals) and the power of some background noise.

In some embodiments, a serving cell algorithm is configured to receive inputs to analyze interference. In some embodiments, the inputs include: (1) cell site data for cell sites in a network that include cell location (e.g., latitude and longitude), band details (e.g., cell frequency bands used by a cell), eNB ID (e.g., evolved NodeB Identifier used to identify an eNodeB), ECGI (E-UTRA Cell Global Identifier commonly used with 4G Long Term Evolution (LTE) nodes). E-UTRA is an acronym for Evolved Universal Mobile Telecommunications System (UMTS) terrestrial radio access, also referred to as the 3GPP work item on the LTE. E-UTRA is the air interface of 3rd Generation Partnership Project (3GPP) LTE upgrade path for mobile networks. E-UTRAN is the initialism of evolved UMTS Terrestrial RAN and is the combination of E-UTRA, UE, and E-UTRAN Node B or Evolved Node B (eNodeB). (2) geographical boundaries (of the network and grids within the network); (3) geo-located data collected over a predetermined period of time (e.g., 7 days) using drive test tools as well as passively collected data (e.g., KPIs (key performance indicators) data from UEs).

ENodeB also known as evolved Node B (abbreviated as eNodeB or eNB), is the element in E-UTRA of LTE that is the evolution of the element Node B in UTRA of UMTS. ENB is the hardware that is connected to the RAN that communicates directly wirelessly with mobile handsets (UEs), like a Base Transceiver Station (BTS) in Global System for Mobile communications (GSM) networks.

Network quality degradation through interference is commonly caused by the overlap of multiple cells coverage in the same location. The interference creates issues such as call dropping, UE handover failure, and throughput issues that result in negative customer Quality of Experience (QoE). While some overlapping of cells is desired for cell UE handover (the process of transferring an ongoing call or data session from one channel connected to the CN to another channel), overlap of multiple cells (e.g., greater than two) in the same location creates negative issues such as call dropping, UE handover failure, and throughput issues.

In some embodiments, a Server Cell Identification (SCI) algorithm, is configured to use collected geo located data, identify a geographic location where interference and/or poor network coverage is possibly experienced by customers. In some embodiments, the SCI algorithm also identifies a coverage cell in the geographic area providing the highest ranked network coverage within a predetermined grid (i.e., a main server (MS)). In some embodiments, the SCI algorithm identifies potential interferer cells (e.g., cells potentially causing interference with other cells or the highest ranked cell) of that geographic area. In some embodiments, the SCI algorithm identification of potential interferer cells allows engineers to optimize the interferer cells to reduce interference.

FIG. 1A is a diagrammatic representation of a Server Cell Identification (SCI) system 100, in accordance with some embodiments.

SCI 100 includes a CN 102 communicatively connected to RAN 104 through backhaul 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). In locations where geographic coverage cells 114 overlap, interference areas, such as interference area 122, exist. CN 102 includes one or more service provider(s) 116, KPI servers 118, and SCI module 120.

CN 102 (also known as a backbone) is a part of a computer network which interconnects networks, providing a path for the exchange of information between different Local Area Networks (LANs) or subnetworks. In some embodiments, CN 102 ties together diverse networks over wide geographic areas, in different buildings in a campus environment, or in the same building.

In some embodiments, RAN 104 is a GSM RAN, a GSM/EDGE RAN, a UMTS RAN (UTRAN), an E-UTRAN, Open RAN (O-RAN), or Cloud-RAN (C-RAN). RAN 104 resides between user equipment 112 (e.g., mobile phone, a computer, or any remotely controlled machine) and CN 102. RAN 104 is shown as a C-RAN for purposes of simplified representation and discussion. In some embodiments, Base Band Units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, backhaul portion 106 of SCI 100 comprises the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global internet. UE 112 communicating with a base station 108 constitute a local subnetwork. The connection between base station 108 and UE 112 begins with backhaul 106 connected to CN 102. In some embodiments, backhaul 106 includes wired, fiber optic and wireless components. Wireless sections include using microwave bands, mesh, and edge network topologies that use a high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a Remote Radio Head (RRH), primary and backup electrical power sources, and sheltering. Base stations are known by other names such as base transceiver station, mobile phone mast, or cell tower. In some embodiments, base stations are replaced with other edge devices configured to wirelessly communicate with UEs. The edge device provides an entry point into service provider CNs, such as CN 102. Examples include routers, routing switches, Integrated Access Devices (IADs), multiplexers, and a variety of Metropolitan Area Network (MAN) and Wide Area Network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc is 60°, 90° or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or Ultra-High Frequency (UHF) frequencies (300 MHz to 3 GHz). In other examples, antenna(s) 110 are chosen for their size and directional properties. In some embodiments, the antenna(s) 110 are MIMO (Multiple-Input, Multiple-Output) antenna that send and receive greater than one data signal simultaneously over the same radio channel by exploiting multipath propagation.

In some embodiments, UEs 112 are a computer or computing system. Additionally or alternatively, UEs 112 have a Liquid Crystal Display (LCD), Light-Emitting Diode (LED) or Organic Light-Emitting Diode (OLED) screen interface, such as user interface (UI) 822 (FIG. 8), providing a touchscreen interface with digital buttons and keyboard or physical buttons along with a physical keyboard. In some embodiments, UE 112 connects to the Internet and interconnect with other devices. Additionally or alternatively, UE 112 incorporates integrated cameras, the ability to place and receive voice and video telephone calls, video games, and Global Positioning System (GPS) capabilities. Additionally or alternatively, UEs run Operating Systems (OS) that allow third-party apps specialized for capabilities to be installed and run. In some embodiments, UEs 112 are a computer (such as a tablet computer, netbook, digital media player, digital assistant, graphing calculator, handheld game console, handheld Personal Computer (PC), laptop, Mobile Internet Device (MID), Personal Digital Assistant (PDA), pocket calculator, portable medial player, or ultra-mobile PC), a mobile phone (such as a camera phone, feature phone, smartphone, or phablet), a digital camera (such as a digital camcorder, or Digital Still Camera (DSC), Digital Video Camera (DVC), or front-facing camera), a pager, a Personal Navigation Device (PND), a wearable computer (such as a calculator watch, smartwatch, head-mounted display, earphones, or biometric device), or a smart card.

In at least one embodiment, geographic coverage cells 114 are of any shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate. Coverage depends on several factors, such as orography (i.e. mountains) and buildings, technology, radio frequency and perhaps most importantly for two-way telecommunications the sensitivity and transmit efficiency of UE 112. Some frequencies provide better regional coverage, while other frequencies penetrate better through obstacles, such as buildings in cities. The ability of a UE to connect to a base station depends on the strength of the signal. Coverage gaps are caused by most anything such as faulty equipment, bad weather, animals, accidents and the like. Coverage gaps occur through the loss of one or more sets of transmitter, receivers, transceivers, digital signal processors, control electronics, GPS receivers, primary and backup electrical power sources, and antennas. Additionally or alternatively, coverage gaps exist because of areas never previously covered by cellular service or created by removal of a base station or the like. In some embodiments, coverage gaps develop after the service covering an area is lost for any reason. In other examples, a coverage gap is any area without any cell coverage service to UE for whatever reason.

Service provider(s) 116 are businesses, vendors, or organizations that sell bandwidth or network access by providing direct Internet backbone access to Internet service providers and usually access to its Network Access Points (NAPs). Service providers are sometimes referred to as backbone providers, Internet providers, or vendors. Service providers consist of telecommunications companies, data carriers, wireless communications providers, Internet service providers, and cable television operators offering high-speed Internet access.

KPI servers 118 produce both predictions and live network data. Live-network data (KPIs, UE/cell/MDT (Minimization of Drive Test) traces, and crowdsourced data) allows for modelling of network traffic, hot-spot identification, and radio signal propagation. RF drive testing is a method of measuring and assessing the coverage, capacity and Quality of Service (QoS) of a mobile radio network, such as RAN 104. The technique consists of using a motor vehicle containing mobile radio network air interface measurement equipment that detects and records a wide variety of the physical and virtual parameters of mobile cellular service in a given geographical area. By measuring what a wireless network subscriber would experience in any specific area, wireless carriers make directed changes to their networks that provide better coverage and service to their customers. Drive testing commonly is configured with a mobile vehicle outfitted with drive testing measurement equipment. The equipment is usually highly specialized electronic devices that interface to Original Equipment Manufacturer (OEM) mobile handsets (UEs). This ensures measurements are realistic and comparable to actual user experiences.

UE/cell/MDT traces collected at the Operations Support Systems (OSS) or through dedicated tools provide service provider(s) 116 with user-level information. Once geo-located, UE/cell/MDT traces are used to enhance path-loss calculations and prediction plots, as well as to identify and locate problem areas and traffic hotspots. KPI servers 118 allow service provider(s) 116 to use UE/cell/MDT traces along with SCI module 120 for network optimization.

In some embodiments, SCI module 120 identifies interference areas, such as interference area 122. There are essentially two types of interference for the purposes of the present discussion. Internal interference in a network, such as RAN 104, occurs due to the coverage of two cells in same geographical area, such as cells 114A and 114B, of the same vendor or service provider overlapping. External interference in a network, such as RAN 104, occurs due to the coverage of two cells, such as cells 114A and 114B, of two different vendors or service providers in the same location.

Figure 8:
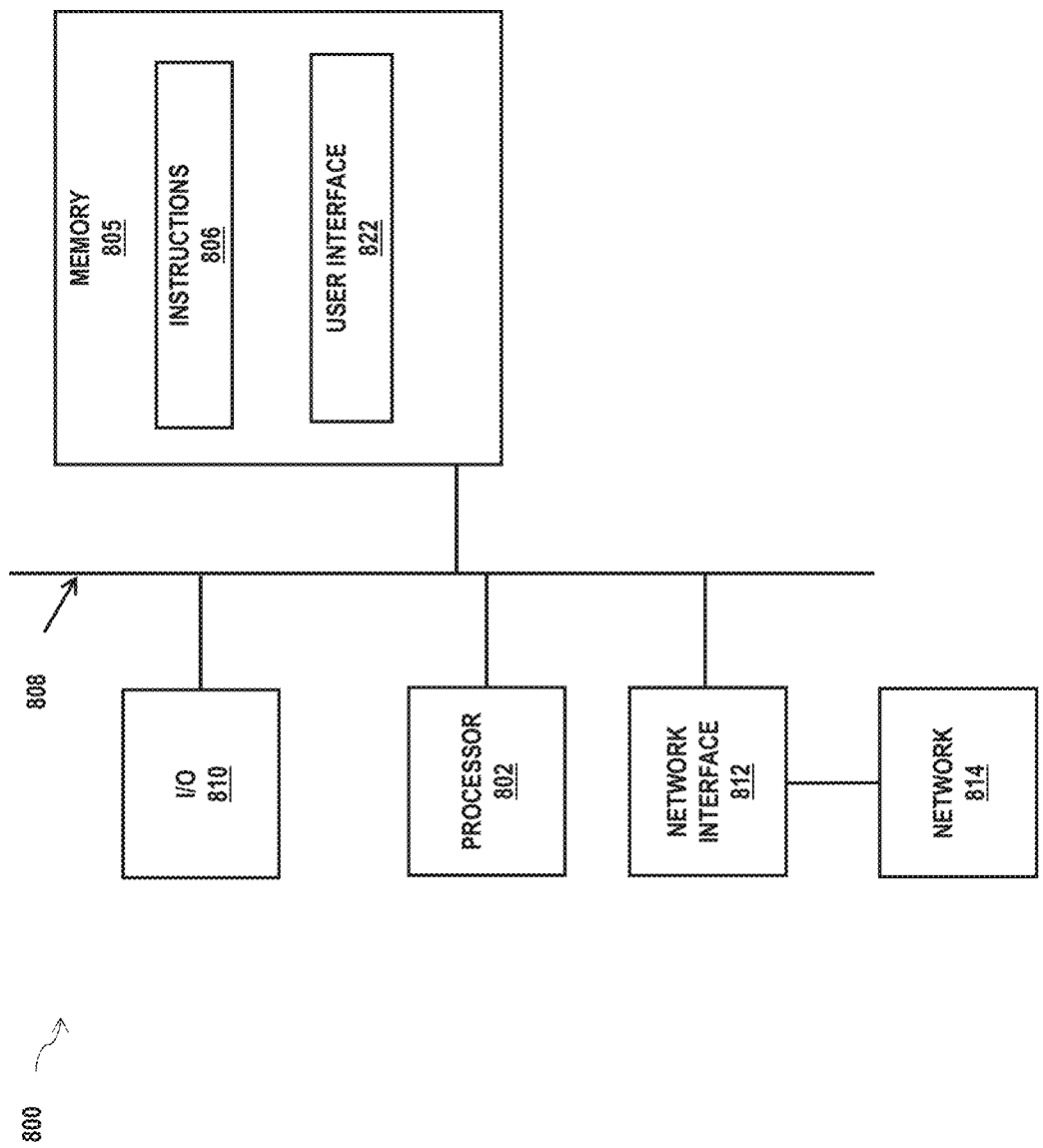
FIG. 8 is a high-level functional block diagram of a processor-based system, in accordance with some embodiments.

In some embodiments, SCI module 120 gathers geo-located sample data. In some embodiments, this geo-located data is provided by KPI servers 118. In some embodiments, the geo-located sample data is provided by a database or memory, such as memory 805 (FIG. 8). In some embodiments, the geo-located data includes serving ENodeB ID (i.e., the identifier of the node at the base station). In some embodiments, the geo-located data is provided and/or collected through drive testing, UE KPIs reported by the UE, such as UEs 112, base station KPI reporting through Central Units (CU) or Distribution Units (DU) associated with a base station, such as base stations 108, or other suitable methods of collecting geo-located data in accordance with some embodiments.

In some embodiments, SCI module 120 gathers NR EARFCN. An Absolute Radio-Frequency Channel Number (ARFCN) is a code that specifies a pair of reference frequencies used for transmission and reception in radio system. In a Frequency Division Duplex (FDD) system one ARFCN number is used for downlink and another for uplink as downlink and uplink frequencies are different. In a Time Division Duplex (TDD) system only one ARFCN number is used as downlink and uplink frequency remains the same. The term ARFCN originated with GSM and evolved with the new technologies. For example, UARFCN for UMTS/WCDMA, EARFCN for E-UTAR/LTE and NR-ARFCN for 5G/New Radio. NR-ARFCNs for 5G new radio are defined in 3GPP specification 38.101-1 and 38.101-2, both of which are incorporated by reference herein in their entireties.

In some embodiments, SCI module 120 gathers the Physical Cell ID (PCI). PCI used to indicate the physical layer identity of a cell. The PCI is used for cell identity during cell selection procedure. The purpose of PCI optimization is to ensure to a great extent that neighboring cells have different primary sequences allocated. Good PCI assignment reduces call drops by enabling UE to clearly distinguish one cell from another.

In some embodiments, SCI module 120 gathers the latitude and longitude of the node (e.g., gNB) or base station 108. In some embodiments, SCI module 120 gathers the Reference Signal Received Power (RSRP). RSRP is an acronym for reference signal received power which is a measurement of the received power level in an LTE cell network. The average power is a measurement of the power received from a single reference signal. RSRP is the power of the LTE reference signals spread over the full bandwidth and narrow band. In some embodiments, the file data is in a specific file format (e.g., grid type patterns). In some embodiments, the RSRP is obtained from KPI servers 118.

In some embodiments, SCI module 120 gathers the Reference Signal Received Quality (RSRQ). RSRQ is used in 5G New Radio (NR) networks to determine the quality of the radio channel. RSRQ, unlike RSRP (desired signal strength), also includes interference level due to the inclusion of Received Signal Strength Indicator (RSSI) in the calculation. RSRQ is also used for cell selection and handover, if the RSRP is not sufficient.

RSRQ is defined using equation (1).

$$RSRQ = \frac{(N \cdot RSRP)}{RSSI} \qquad \text{eq. (1)}$$

RSSI is wide band power including signal power from serving cell (MS), co-channel neighbor cell (NS), and interference from other cells interference and noise. RSRQ is the purity of the Reference Signal (RS) across the system bandwidth. RSRQ is a calculated value from RSRP and RSSI and is a measure of signal and interference. As RSRQ is a ratio of two signal powers with same unit i.e. dBm so RSRQ uses dB as a measurement unit. The best value of RSRP is about −3 dB and worst value can be −19.5 dB.

In some embodiments, SCI module 120 geo bins the collected data. As the data collection occurs, SCI module 120 performs a binning operation on the collected data. In some embodiments, SCI module 120 obtains the mean of all the values in a predetermined region, such as in a 100 meter by 100 meter grid. In some embodiments, SCI module 120 determines the edges (e.g., NW, SW, NE & SE) of a geographic area, divides the geographic area into 100×100 meter grids, looks up values within each grid, computes an average (mean), and attributes the mean to the latitude and longitude at the center of the grid.

In some embodiments, SCI module 120 determines a list of interferers. In some embodiments, a graphic user interface displays the geo binning data allowing a user or service provider to visualize the interference geographically. In some embodiments, SCI module 120 allows an engineer or network operator to simulate network changes and the interference impact of these changes, i.e. antenna tilting, powering down, beam forming, beam selection, and other suitable modifications in accordance with some embodiments.

Figure 2:
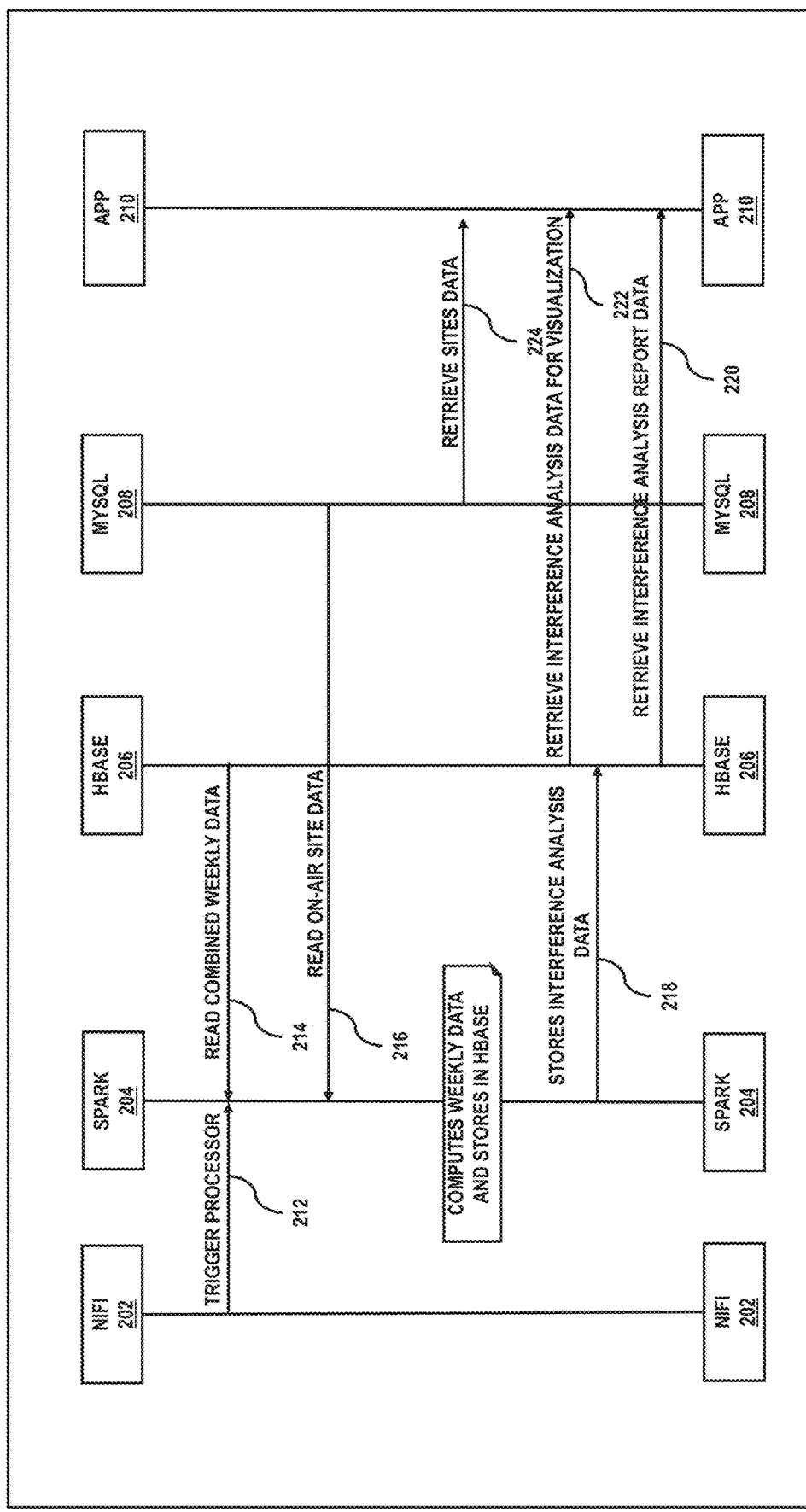
FIG. 2 is a data flow diagram of a SCI module, in accordance with some embodiments.

FIG. 2 is a data flow diagram of a SCI module 120, in accordance with some embodiments.

SCI module 120 includes a NIFI component 202, a Spark component 204, an Hbase-component 206, a MySQL component 208, and an Application component 210.

In some embodiments, NIFI-component 202 automates the flow of data between SCI module 120 and KPI servers 118. NIFI-component 202 ingests data from third party applications, the data including latitude and longitude for each base station, such as base station 108, frequency band details, eNB ID, ECGI, drive test data, KPIs, and other suitable data in accordance with some embodiments. In some embodiments, NIFI-component 202 is an open source platform based on the concept of extract, transform, and load. The software design is based on the flow-based programming model and offers features that include the ability to operate within clusters, security using Transport Layer Security (TLS) encryption, extensibility (e.g., users can write their own software to extend its abilities) and improved usability features like a portal which is used to view and modify behavior visually. NIFI-component 202 is used to schedule jobs, trigger flow and ingest data from third-party applications like raw files from KPI servers 118.

Spark-component 204 is an open-source unified analytics engine for large-scale data processing. Spark-component 204 provides an interface for programming entire server clusters with implicit data parallelism and fault tolerance. Spark-component 204 is a parallel processing framework for running large-scale data analytics applications across clustered computers. Spark-component 204 handles both batch and real-time analytics and data processing workloads.

Hbase-component 206 provides a fault-tolerant way of storing large quantities of sparse data (e.g., small amounts of information caught within a large collection of empty or unimportant data). Hbase-component 206 is a column-oriented non-relational database management system that runs on top of a Hadoop Distributed File System (HDFS). HBase provides a fault-tolerant way of storing sparse data sets, which are common in many big data use cases.

HDFS-component (not shown) is a distributed file-system that stores data on commodity machines, providing very high aggregate bandwidth across server clusters. All batched data sources are initially stored into HDFS-component and then processed using Spark-component 204. Hbase-component 206 also utilizes HDFS as its data storage infrastructure.

MySQL-component 208 is an open-source Relational Database Management System (RDBMS). A relational database organizes data into one or more data tables in which data types are related to each other and these relations help structure the data. MySQL component 208 creates, modifies and extracts data from Spark-component 204 at operation 216, as well as controls user access. MySQL-component 208 is utilized for Application Programming Interface (API) retrieval and for serving any real-time User Interface (UI), such as UI 822 (FIG. 8). The aggregated and correlated data is also stored in MySQL.

Figure 5A:
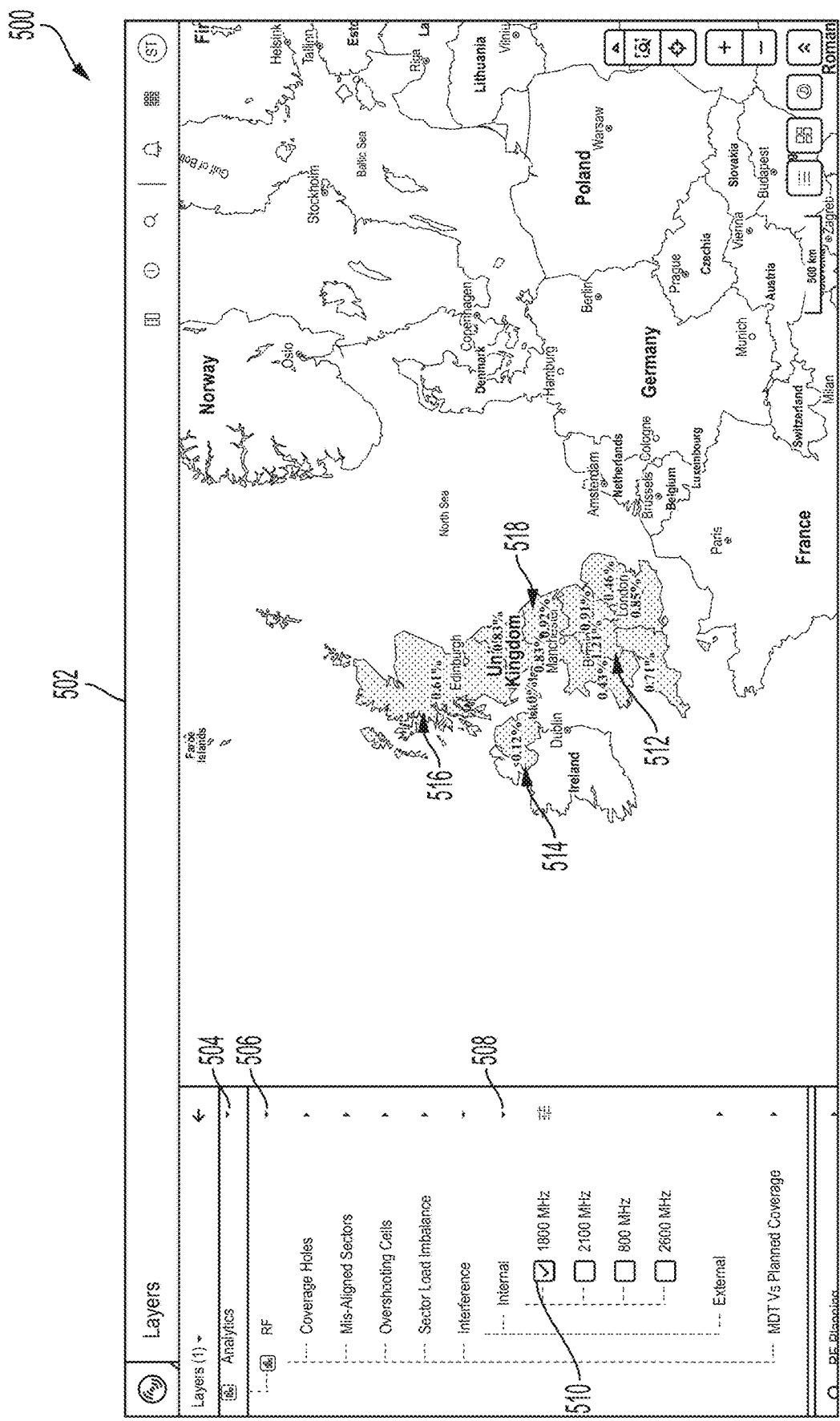
FIGS. 5A, 5B, 5C, 5D, and 5E are pictorial representations of a SCI user interface, in accordance with some embodiments.
Figure 5B:
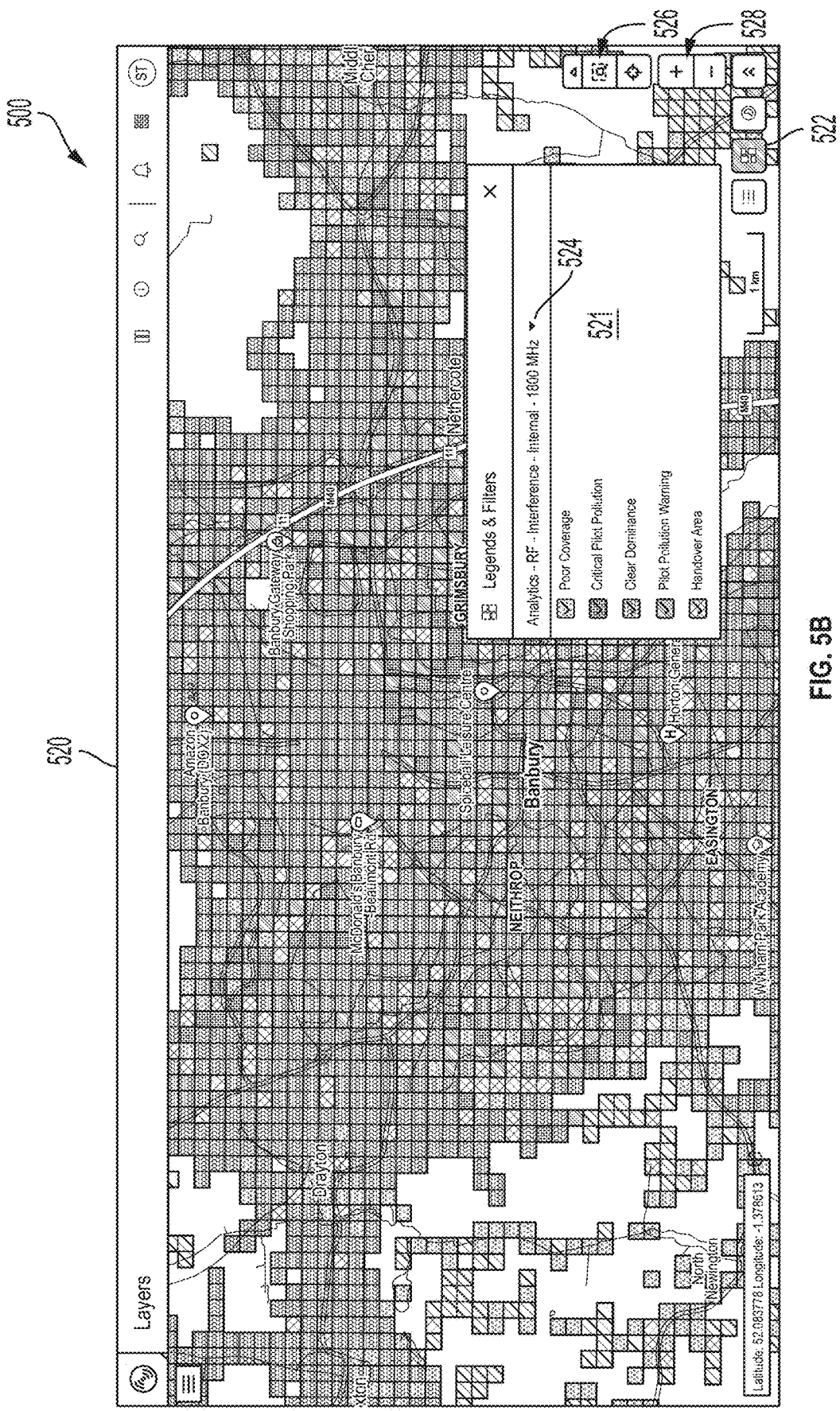

Application component 210 allows a user, through a UI such as UI 822 of FIG. 8, to visualize the server cell identification (e.g., retrieve interference analysis data for visualization) at operation 222. A user is able to visualize varying aspects of the SCI in real time including interference analysis report data at operation 220. In some embodiments, a user is able to visualize internal interference over specified bands and varying geographic areas (FIG. 5A). In some embodiments, a user is able to visualize individual grids (e.g., 100 meter×100 meter geographic areas) based on an internal inference analysis (FIG. 5B). For example, a user is able to determine whether a grid (e.g., a 100 meter×100 meter geographic area) is experiencing poor coverage, whether any NS within the grid is a critical interferer cell, whether the grid has a clearly dominate MS cell, whether any NS cell has a interferer warning, or whether the internal interference is a handover area.

Figure 5C:
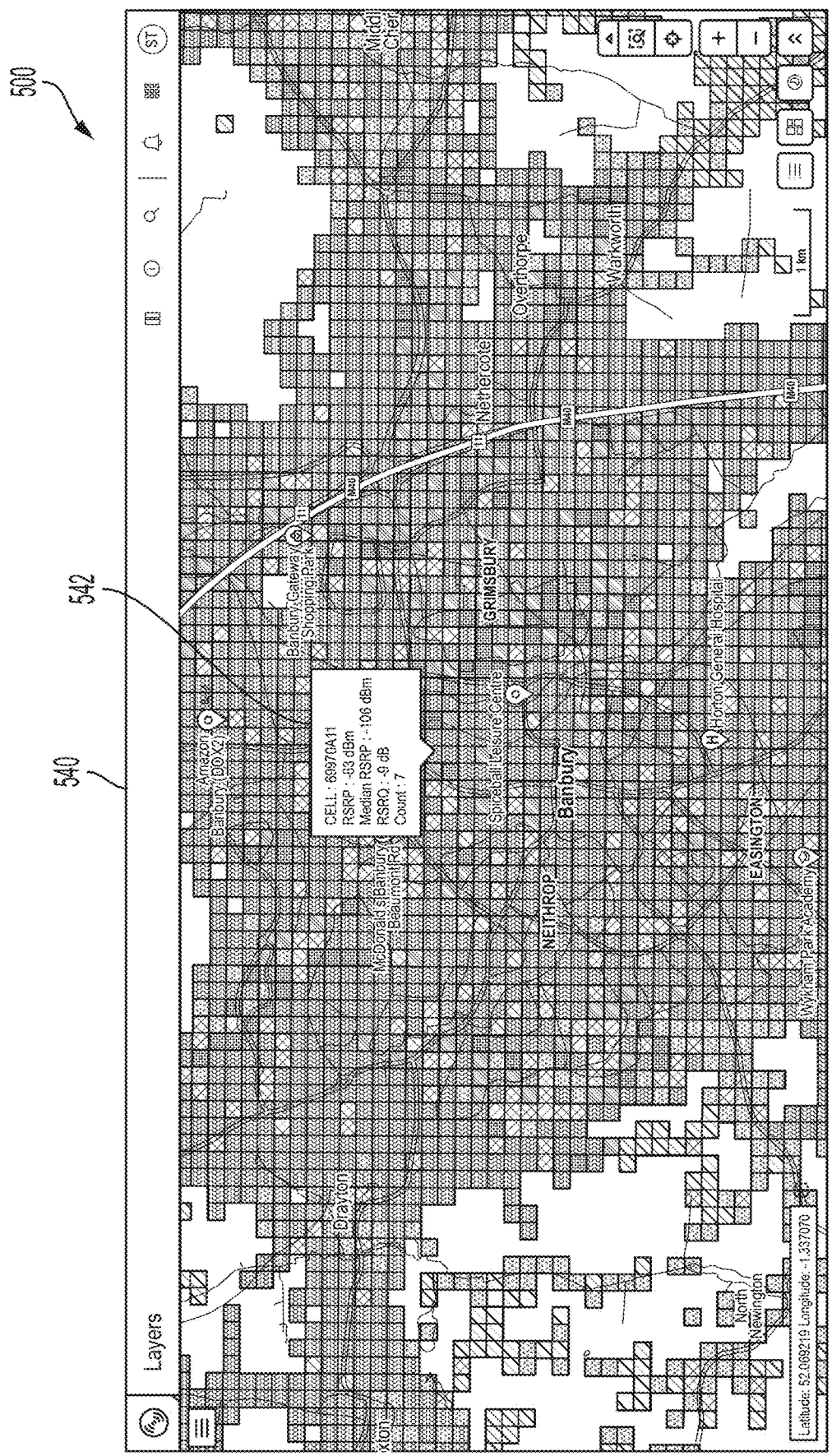
Figure 5D:
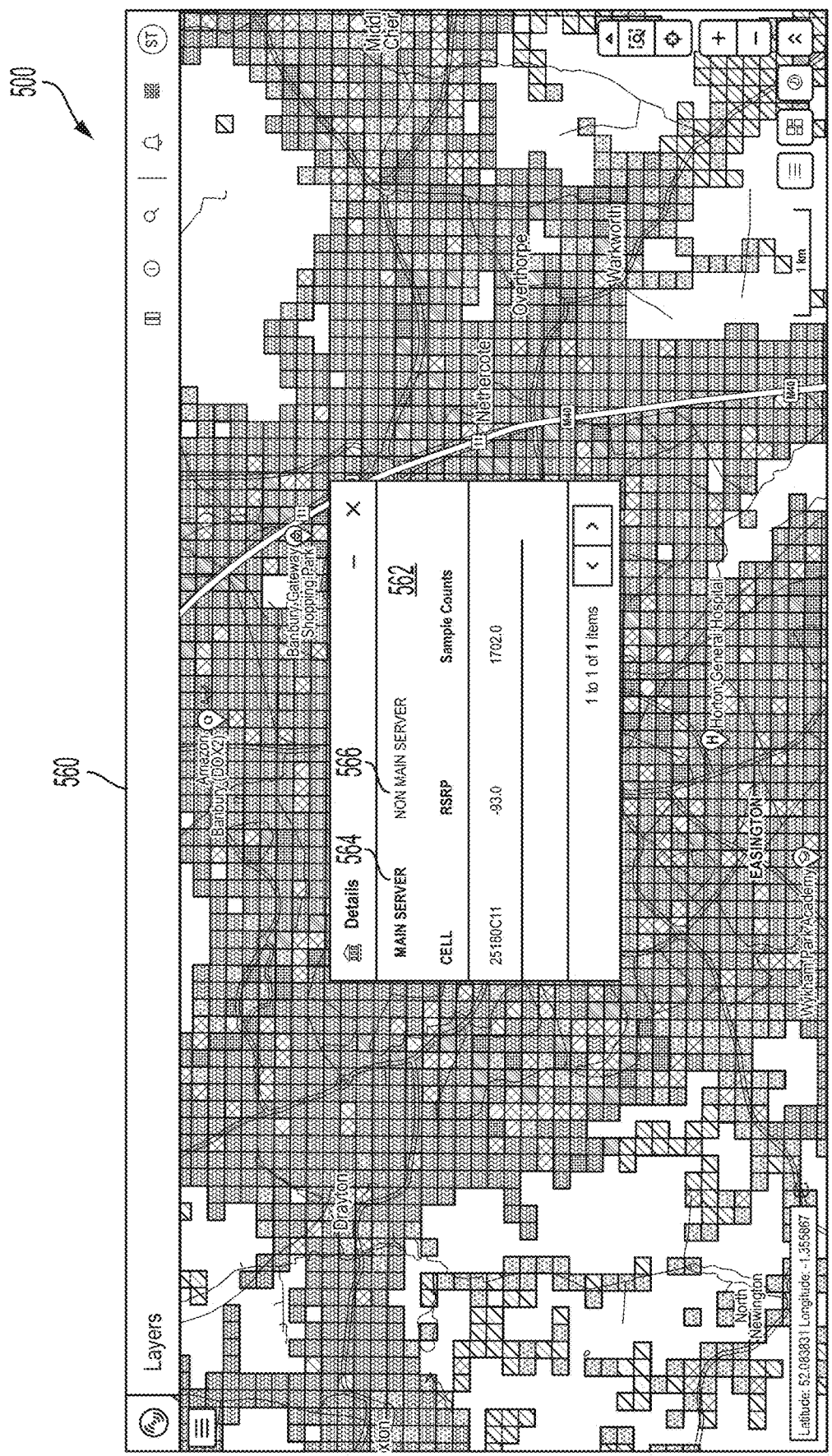
Figure 5E:
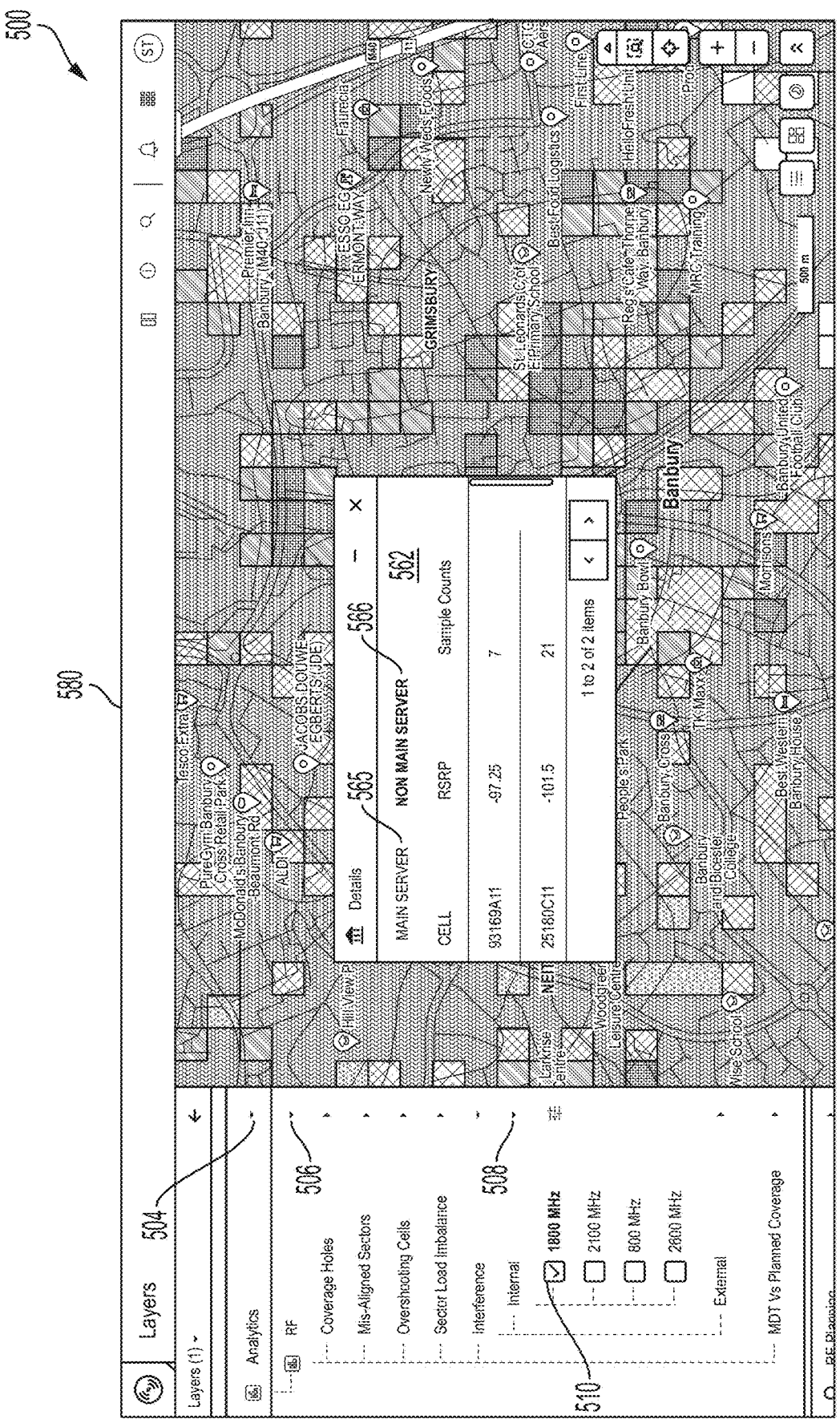
Figure 7A:
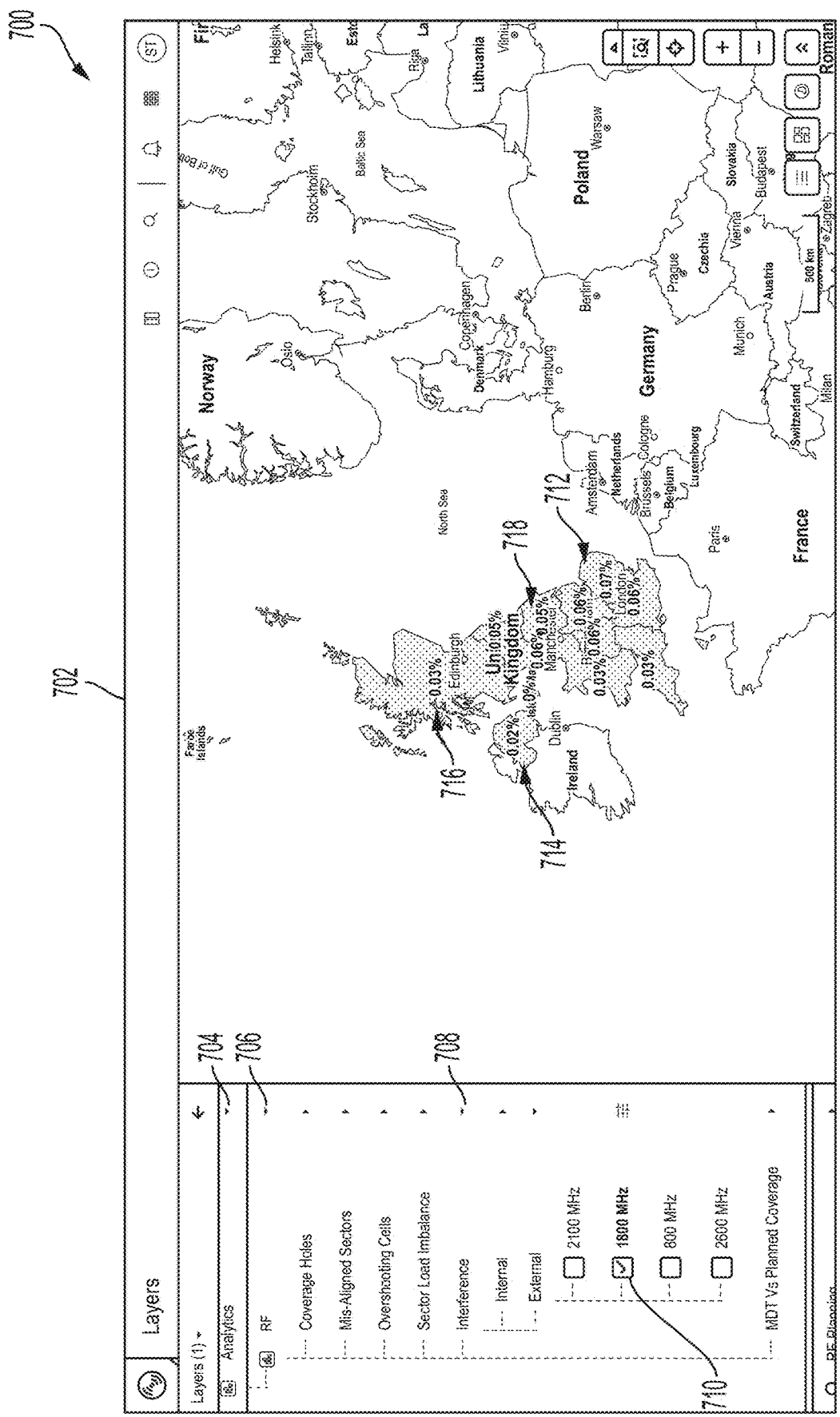
FIGS. 7A, 7B, and 7C are pictorial representations of a SCI user interface, in accordance with some embodiments.
Figure 7B:
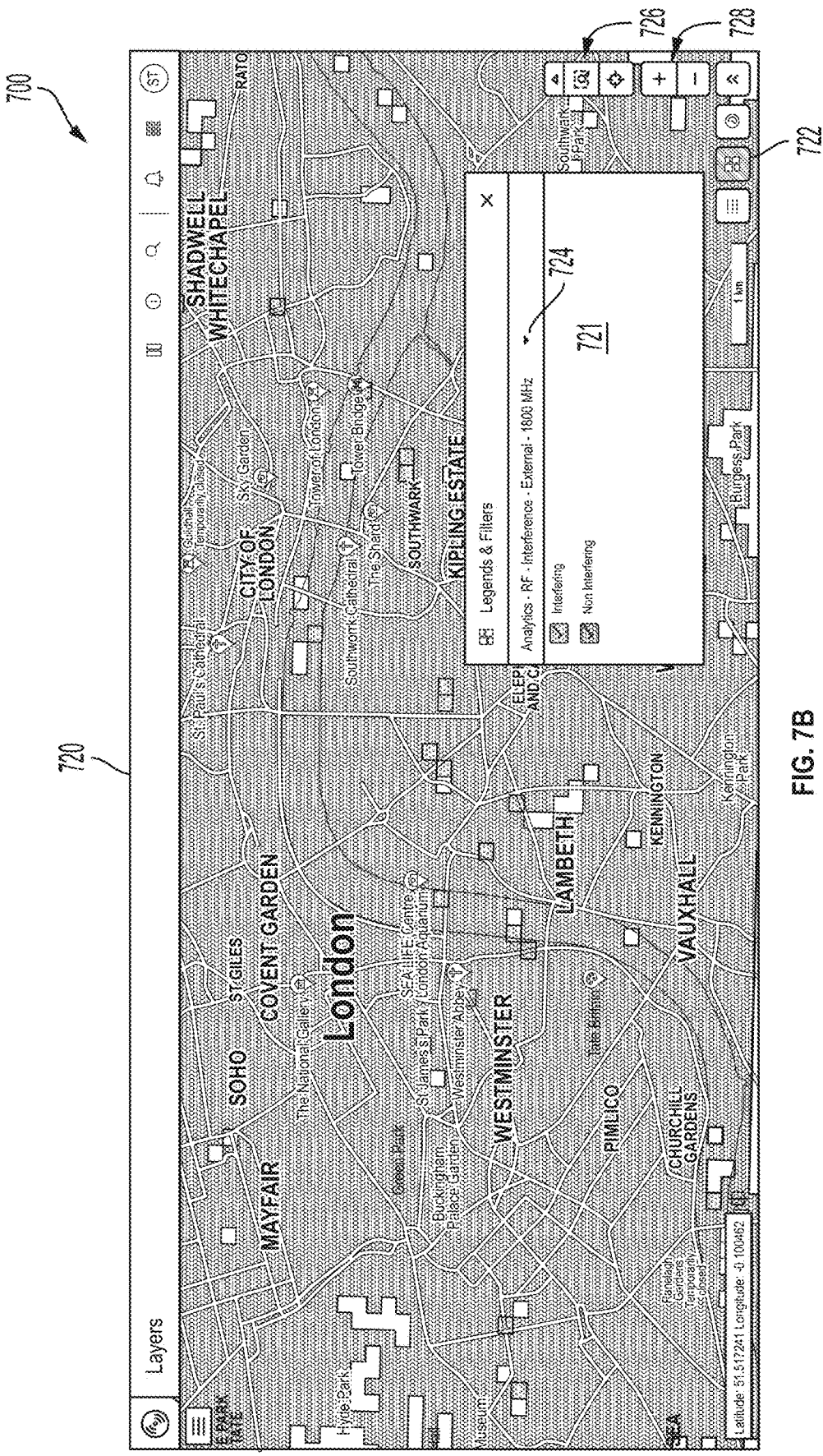
Figure 7C:
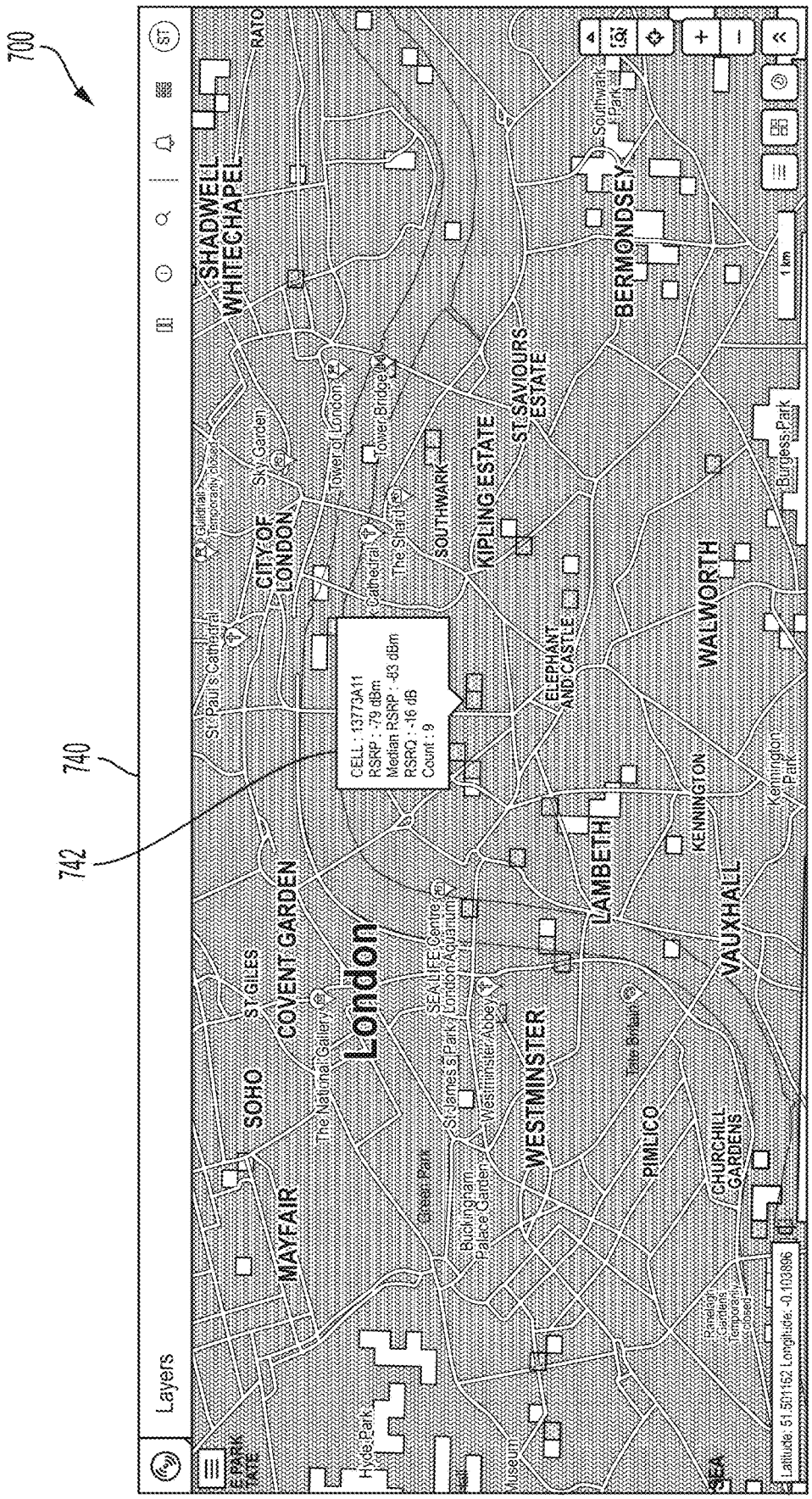

In some embodiments, a user is able to drill down into details within the grid. In some embodiments, a user is able to hover over or click on a grid and a pop-up box reveals information such as cell ID, cell RSRP, cell median RSRP, cell RSRQ, and the number of cells within the grid (FIG. 5C). In some embodiments, a user is able to visualize details regarding the MS cell and the NS cells in each grid. For example, the user is able to visualize in a pop-up box a cell ID of the MS cell, the MS cell RSRP, and the number of sample counts for the MS cell (FIG. 5D). Continuing with the example, a user is able to visualize within the same or separate pop-up box (e.g., a NS tab) the cell ID of the NS cells, each NS cell RSRP, and the number of sample counts for each NS cell (FIG. 5E). In some embodiments, a user is able to visualize external interference over specified bands in varying geographic areas (FIG. 7A). In some embodiments, a user is able to visualize whether a grid has external interference or not (FIG. 7B). In some embodiments, a user is able to obtain grid details, such as cell ID, cell RSRP, cell median RSRP, cell RSRQ, and a number of cells within any grid (FIG. 7C).

At operation 212, spark component 204 retrieves third party data from NIFI component 202. In some embodiments, the inputted third party data includes site information from a site database, such as a latitude and longitude of all cells in a RAN, frequency band details, eNB ID, ECGI, and other suitable information. In some embodiments, the inputted data additionally includes geo-located data, such as RF drive testing information, UE KPI data or other passively collected data. In some embodiments, the geo-located data is collected over a continually running window of time, such as 7 days. In some embodiments, the geo-located data is collected over greater than 7 days and in some embodiments the geo-located data is collected over less than 7 days. In some embodiments, the window of time for collection of geo-located data is controlled by a sliding window algorithm. In some embodiments, the collected data is collected in a FIFO (First In, First Out) manner where as new data is collected older data is removed (e.g., data greater than 7 days old).

Spark component 204 stores the geo-located data in Hbase component 206 and retrieves the stored data at operation 214 to perform an interference analysis. At operation 218, Spark component 204 stores the interference analysis in Hbase component 206. Continuing with operation 216, MySQL 208 retrieves site information from Spark component 204 and combines the site information for Application 210. Application 210, at operation 222, retrieves the interference analysis data from Hbase component 206 for visualization. Application component 210 further retrieves interference analysis report data at operation 220 for visualization.

Figure 3:
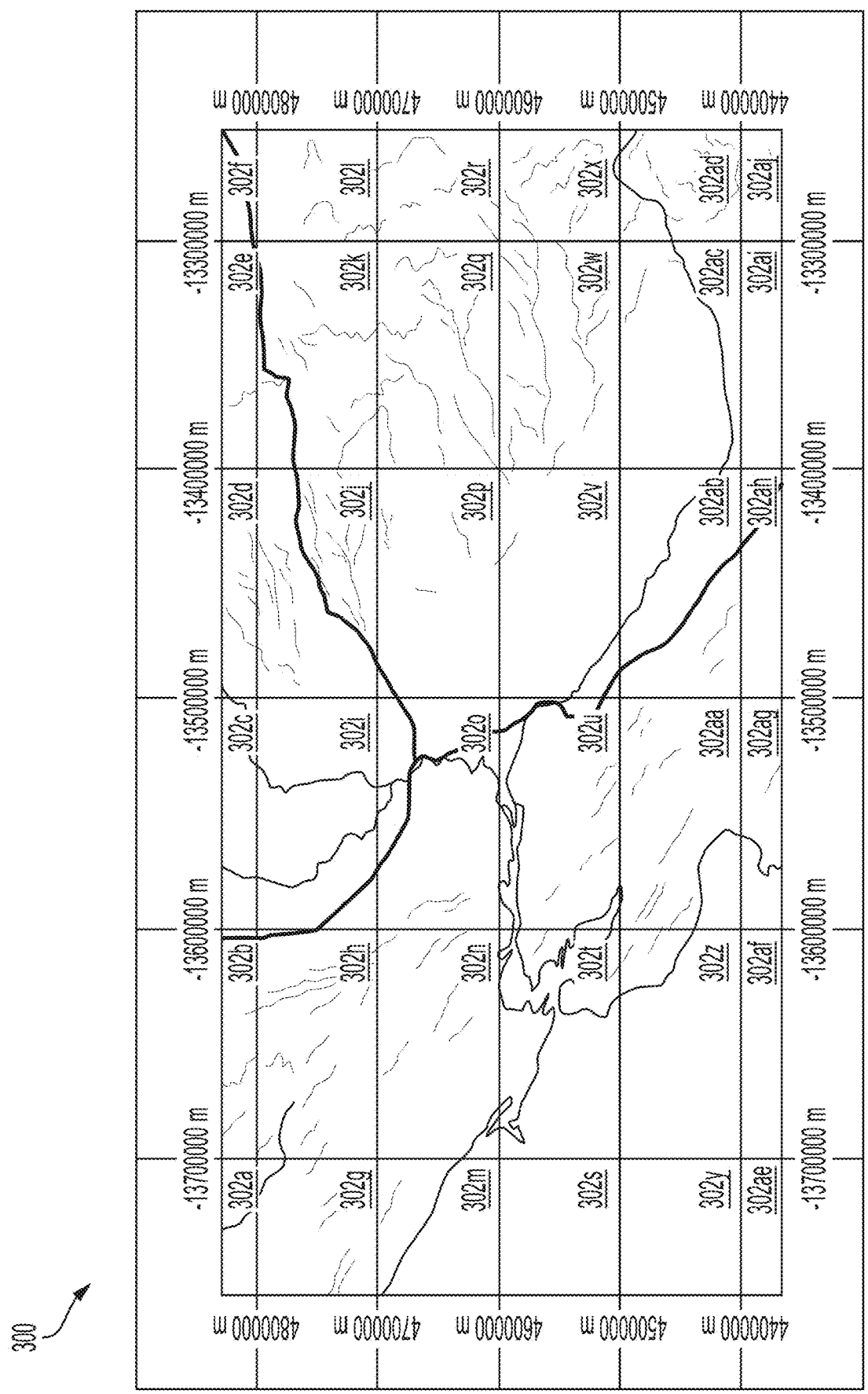
FIG. 3 is a pictorial representation of a geographic area with grids, in accordance with some embodiments.

FIG. 3 is a pictorial representation of a geographic area 300 with grids 302a-302aj, in accordance with some embodiments.

A RAN coverage area 300 from the site data is identified from the site details. RAN coverage area 300 is divided into grids 302a-302aj where, in some embodiments, each grid of grids 302a-302aj represents a 100 meter×100 meter geographic area. In some embodiments, grids 302a-302aj are 10,000 square meters. In some embodiments, grids 302a-302aj are configured with varying sizes. In some embodiments, the size of grids 302a-302aj is adjustable by an operator.

Figure 4:
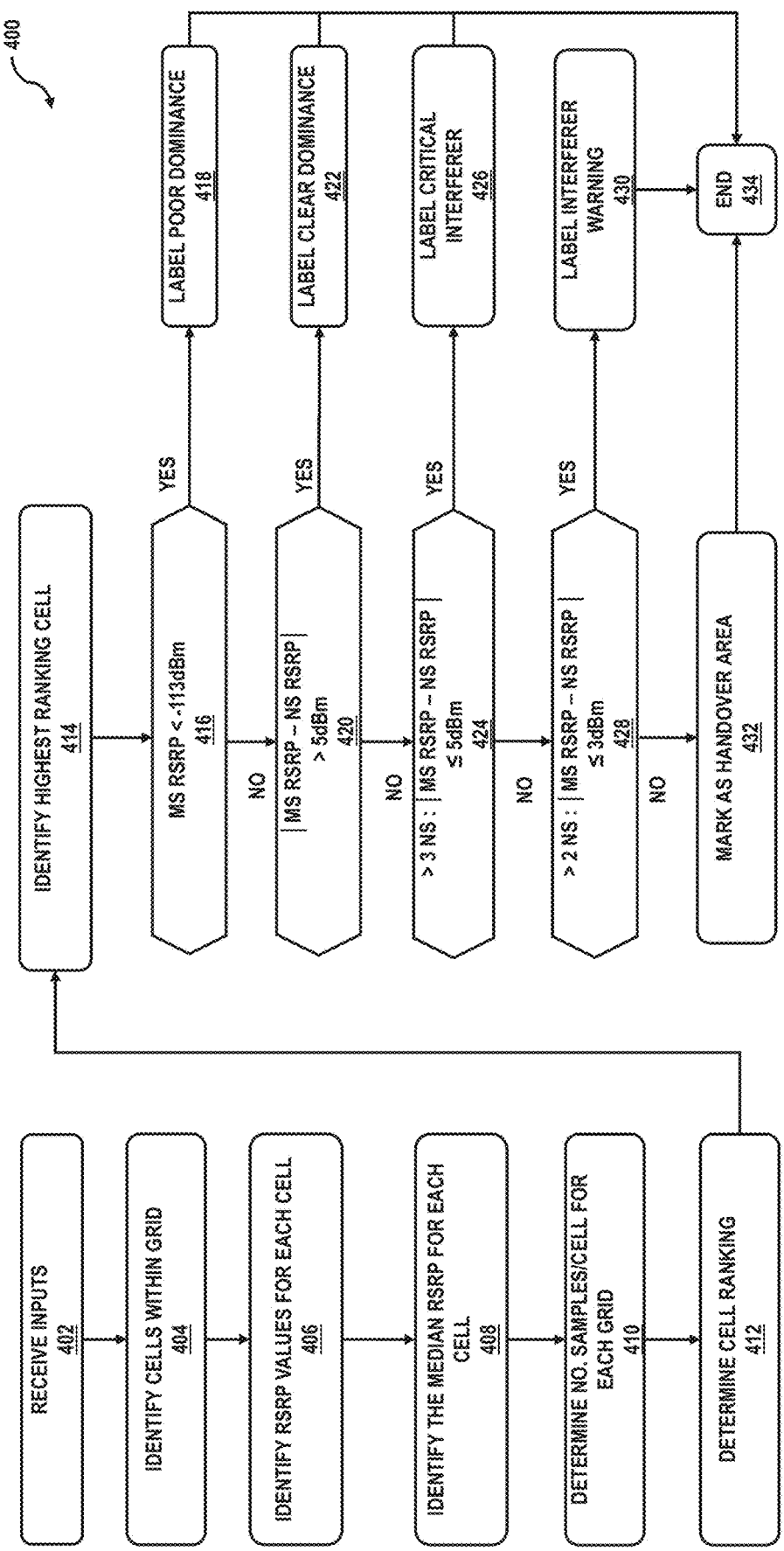
FIG. 4 is a flow diagram representation of a method for SCI with internal interference, in accordance with some embodiments.

FIG. 4 is a flow diagram representation of a method 400 for SCI with internal interference, in accordance with some embodiments.

While the operations of method 400 are discussed and shown as having a particular order, each operation in method 400 is configured to be performed in most any order unless specifically called out otherwise. Method 400 is implemented as a set of operations, such as operations 402 through 434. As discussed, internal interference is interference in a RAN, such as RAN 104, that occurs when the coverage of two cells, of the same vendor, overlap at a geographic area, such as interference area 122.

At operation 402 of method 400, the geo-located data inputs are received. In some embodiments, NIFI component 202 gathers geo-located samples that include serving eNB IDs, NR EARFCNs, PCIs, cell latitude and longitude, cell RSRP, cell RSRQ and other suitable geo-located samples in accordance with some embodiments. In some embodiments, the geo-located data is geo binned. Binning, also called discrete binning or bucketing, is a data pre-processing technique used to reduce the effects of minor observation errors. The original data values which fall into a given small interval, a bin, are replaced by a value representative of that interval, often the central value. Binning is a form of quantization. In some embodiments, Spark component 204 performs the geo-binning.

Operational flow moves from operation 402 to operation 404, where individual cells are identified within each grid, such as grids 302a-302aj. Process flow moves from operation 404 to operation 406.

At operation 406, an RSRP value for each cell, identified in operation 404, is identified. Process flow moves from operation 406 to operation 408.

At operation 408, a median RSRP for each cell in each grid is identified. In some embodiments, a median RSRP for each grid is determined and identified as well. In some embodiments, as each cell includes tens, hundreds, or even thousands of samples, a median RSRP is determined to provide a representation of an RSRP value over time. Process flow moves from operation 408 to operation 410.

At operation 410, a total number of data samples per cell for each grid is determined. In some embodiments, the total number of data samples per cell is determined by examining the input data in operation 402. In some embodiments, a total number of data samples is already known from the median RSRP value determination at operation 408. Process flow moves from operation 408 to operation 412.

At operation 412, a cell ranking for each cell is determined. In some embodiments, the cell ranking is determined with equation (2).

$$\text{Cell Ranking} = \text{Total Number of cell samples} \cdot 10^{\left(\frac{\text{Cell Median RSRP}}{10}\right)} \quad \text{eq. (2)}$$

From equation 2, cell ranking weight is given to the number of samples, thus the more samples attributed to a cell, the better the cell's chance of having a high ranking. Thus, cell ranking weight is given to cells where more is known about the cell. In some embodiments, the more samples equates to a higher ranking.

Equation 2 also places cell ranking weight on the median RSRP of the cell (determine through geo-binning). RSRP is measured in negative decibels milliwatts (dBm). A higher value or a less negative value means a stronger signal (e.g., a RSRP of −50 dBm is a stronger signal than a RSRP of −80 dBm). Keeping in mind an order of magnitude to a negative power will produce a decimal value, the lower (e.g., more negative) the RSRP the lower the cell ranking. In contrast, the higher (less negative) the RSRP, the higher the cell ranking. Thus, cell ranking weight is given to cells where the RSRP is a desirable signal (e.g., less negative or closer to zero). In some embodiments, the stronger RSRP equates to a higher ranking. In some embodiments, other cell ranking methods are suitable in accordance with some embodiments.

In some embodiments, cell ranking is a continual real time process. Process flows from operation 412 to operation 414.

At operation 414, based on the cell ranking at operation 412, a highest-ranking cell per grid is determined. A grid cell with the highest-ranking is labeled as a Main Server (MS) and other cells within the grid are labeled as Non-main Server (NS). In some embodiments, MS cell and NS cell(s) are possibly swapped or changed in real time based on a change in the cell rankings. For example, if a MS cell had an equipment failure that caused the RSRP to drop significantly, the MS cell loses the MS cell label and becomes an NS cell after an updated cell ranking lowers the cell in the cell ranking process of operation 412. Process flows from operation 414 to operation 416.

At operation 416, a determination is made as to whether the MS cell RSRP is less than −113 dBm indicating a weak signal. When the MS cell RSRP is less than −113 dBm, process flows to operation 418 and the MS cell is labeled as having poor dominance as the RSRP is low even though the MS cell is the highest-ranking cell in the grid. In some embodiments, labeling a MS cell as poor dominance assists engineers and network operators in troubleshooting to raise the RSRP of the poor dominance RSRP and provide customers with better coverage.

When the MS cell RSRP is greater than −113 dBm, process flows to operation 420. At operation 420, a determination is made as to whether the absolute value of the difference between the MS cell RSRP and each NS RSRP of the grid is greater than 5 dBm (thus, there is a 5 dBm difference in RSRP between the MS cell and each one of the NS cells within the grid). When there is an RSRP difference of greater than 5 dBm between the MS cell and each of the NS cells within the grid, process flows to operation 422 where the MS cell is labeled as having clear dominance in the grid. In some embodiments, this indicates the MS cell has clearly dominate coverage within the grid.

When the difference of the RSRP values between the MS cell and one of the NS cells is less than or equal to 5 dBm, process flows to operation 424. At operation 424, a determination is made as to whether greater than three NS cells have a difference in RSRP less than or equal to 5 dBm with the MS cell. When greater than three NS cells have a difference in RSRP less than or equal to 5 dBm with the MS cell, process flows to operation 426 and the four or more NS cells identified are labeled as critical interferer cells. In some embodiments, any grid with greater than three NS cells within 5 dBm RSRP of the MS cell is labeled as a critical interferer. In some embodiments, the RSRP difference is greater than 5 dBm. In some embodiments, the RSRP difference is less than 5 dBm. In some embodiments, the RSRP difference is set by a network operator. In some embodiments, greater than four NS cells have a less the 5 dBm difference before being labeled as critical interferers. In some embodiments, the number of NS cells required to be less than or equal to 5 dBm from the MS cell is selected by the network operator before being labeled as critical interferers. In some embodiments, a network engineer or network operator is able to modify one or more of the critical interferers to remove the NS cells as critical interferers.

When three or less NS cells each have less than or equal to a 5 dBm difference in RSRP values with the MS cell, then process flows to operation 428. At operation 428, a determination is made as to when greater than two NS cells each have a difference of RSRP values less than or equal to 3 dBm with the MS cell. When two NS cells each have a difference of RSRP values less than or equal to 3 dBm with the MS cell, then process flows to operation 430 and those three or more NS cells are labeled with an interferer warning. In some embodiments, an interferer warning causes a network operator to take action with one or more of the interferer warning NS cells to reduce interference from the one or more interferer warning NS cells. In some embodiments, actions include antenna tilting, lowering transmit power, beamforming, and other suitable transmission modifications.

When one or two or less NS cells each have RSRP values less than or equal to a 3 dBm difference of the with the MS cell, then process flows to operation 432. At operation 432, the two or less NS cells are labeled as a handover area. Thus, the two or less NS cells are designated as handover cells for the MS cell. Each of operation 432, 430, 426, 422, and 418 proceed to operation 434 where the process ends.

Method 400 produces outputs for a user, such as a network engineer or network operator. In some embodiments, one output is an identification of geographic areas of interference based on the geo-located data samples. In some embodiments, one output is an identification of serving cells (NS cells) and MS cell in each grid. In some embodiments, the outputs are displayed visually for the network engineer or network operator.

FIGS. 5A, 5B, 5C, 5D, and 5E are pictorial representations of a SCI user interface 500, in accordance with some embodiments.

In FIG. 5A, user interface 500 includes a display 502 that shows internal interference for an 1800 MHz band. In some embodiments, a user is able to select an analytics selector 504 (e.g., an arrow) that, when clicked on by the user, reveals an RF (radio frequency) selector 506. In some embodiments, a user is able to click on the RF selector to reveal an interference selector 508. In some embodiments, a user is able to click on the interference selector 508 to reveal several radio frequency bands the user is able to select in order to observe the inference at these frequency bands (e.g., 1800 MHz, 2100 MHz, 800 MHz, and 2600 MHz).

In FIG. 5A 1800 MHz is selected at box 510. In some embodiments, display 502 displays each RAN's internal interference at 1800 MHz. In some embodiments, depending on the map scale, the geographic areas displayed are larger or smaller. In FIG. 5A where each inch represents 500 km, the internal interference at 1800 MHz is displayed as a percentage over the area of interest (e.g., 0.12% Northern Ireland RAN 514, 0.61% in Edinburgh RAN 516, 0.92% in Manchester RAN 518, and Birmingham RAN 512 1.21%). Thus, for most of the RANs displayed in display 502, less than 1% of the geographical area is experiencing internal interference. Nevertheless, in some embodiments, a vendor, such as service providers 116, that considers any interference over 1% as reducing QoE is able to drill down (e.g., reduce the map scale to zoom into a location) and find where the interference is occurring so a network engineer or network operator is able to diagnose and resolve the interference issue. In some embodiments, the percentage of interference for each RAN indicated in FIG. 5A is geo-binned to determine a mean interference over the entire RAN. For example, using Northern Ireland RAN 514, 0.12% of the grids within Northern Ireland RAN 514 are experiencing internal interference at 1800 MHz.

In FIG. 5B, user interface 500 includes a display 520 that shows internal interference for an 1800 MHz band where the map scale is 1 km per inch. In display 520, a user had drilled down into the Birmingham RAN 512 (FIG. 5A) region of the United Kingdom by reducing the distance scale from 500 km per inch to 1 km per inch. In some embodiments, a user is able to reduce the scale of the map with zoom button 526 or using +/−button 528. In some embodiments, at 1 km per inch, each grid is 100 m×100 m.

In display 520 a user is able to click on legend and filter icon 522 that will open legends and filter box 521. In some embodiments, legend and filter box 521 displays a color or a shade applied to each grid to represent one of: poor coverage, critical pilot pollution (e.g., critical interferer), clear dominance, pilot pollution warning (e.g., interferer warning), and handover area. In some embodiments, any geographic area not represented with a grid is considered a geographical area without network coverage at the frequency selected. Further, a user is also able to click on arrow 524 to switch between internal and external interference as well as the frequency band from the legend and filter box 521.

In FIG. 5C, user interface 500 includes a display 540. In display 540, a user is able to select any grid displayed (i.e., some geographic areas have no grids) to open callout box 542. Callout box 542 allows a user to visualize data related to a specific selected grid. A pointer on callout box 542 displays to the user the selected grid to which the information presented applies. By clicking on a grid, a user is able to obtain information about the MS cell for the grid. In FIG. 5C, the MS cell's cell ID, RSRP, median RSRP, RSRQ, and number of NS cells within the grid. In some embodiments, other information is presented within callout box 542 in accordance with some embodiments. Callout box 542 is able to assist a network engineer or network operator with evaluation of a particular grid of interest while troubleshooting network operation.

In FIG. 5D, user interface 500 includes a display 560. In display 560, a user is able to open a details box 562 providing information about a grid. In some embodiments, details box is opened by clicking on callout box 542. Details box 562 is configured with two tabs, a main server tab 564 and a non-main server tab 566. In the main server tab 564 a user is able to visualize the MS cell ID, the MS RSRP, and the MS sample counts for a particular grid.

In FIG. 5E, user interface 500 includes a display 580. In display 580, a user is able to click on non-main server tab 566 and obtain information about the NS cells within the grid. For each NS cell within the grid the user is able to obtain a NS cell ID, an NS cell RSRP, and an NS cell sample count. From FIG. 5E, the sample counts for the NS cells provide information for network engineers as to why these cells are NS cells. For example, each of the NS cells in non-main server tab 566 has an RSRP (e.g., −97.25 dBm and −101.5 dBm) that is comparable to MS RSRP (e.g., −93.0 (FIG. 5D)). However, the MS cell has 1702 sample counts, while the NS cells have 7 and 21 respectively. Using equation 2 above a network engineer or network operation is able to visualize why the MS cell is the MS cell based upon the sample count in combination with the RSRP.

Figure 6:
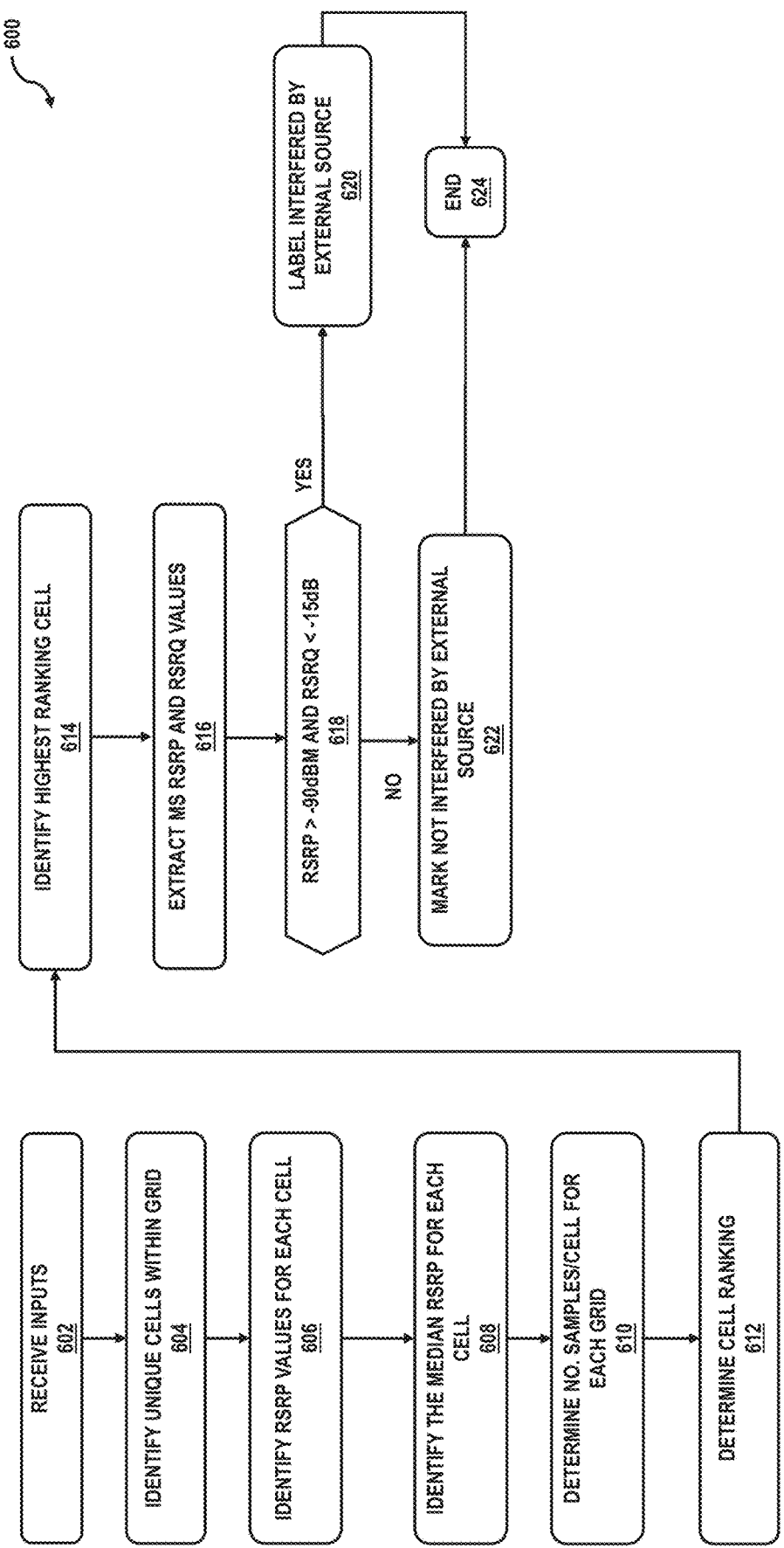
FIG. 6 is a flow diagram representation of a method for SCI with external interference, in accordance with some embodiments.

FIG. 6 is a flow diagram representation of a method 600 for SCI with external interference, in accordance with some embodiments.

While the operations of method 600 are discussed and shown as having a particular order, each operation in method 600 is configured to be performed in most any order unless specifically called out otherwise. Method 600 is implemented as a set of operations, such as operations 602 through 624. As discussed, external interference is interference in a RAN, such as RAN 104, that occurs when the coverage of two cells, of different vendors, overlap at a geographic area, such as interference area 122.

Operations 602 through 614 are like operations 402 through 414 and are not discussed for the sake of brevity.

At operation 616 the MS RSRP and RSRQ values are extracted for use in upcoming calculations in operation 618. In some embodiments, method 600 is unconcerned with NS cells. Process flows from operation 616 to operation 618.

At operation 618 a determination is made as to whether the MS cell has an RSRP greater than −90 dBm and an RSRQ value less than −15 dB. In some embodiments, operation 618 determines whether the MS cell has a good RSRP, but an undesirable RSRQ (e.g., greater than 090 dBm RSRP is satisfactory, but a RSRQ less than −15 dB is at the far end of the desirable range or RSRQ). Thus, a determination is made as to whether the MS cell has a strong signal strength, but more than acceptable interference. When an MS cell has a greater than a −90 bBm RSRP but less than −15 dB RSRQ, then process flows to operation 620 and the MS cell is labeled as interfered by an external source (e.g., a cell of another vendor). Process flows to operation 624 where the process is ended.

When the MS cell has an RSRP greater than −90 dBm, but an RSRQ greater than or equal to −15 db, then process moves from operation 618 to operation 622 where the MS cell is labeled as not interfered by external sources. When the MS cell has an RSRP less than or equal to −90 dBm, and an RSRQ less than −15 db, then process moves from operation 618 to operation 622 where the MS cell is labeled as not interfered by external sources. When the MS cell has an RSRP less than or equal to −90 dBm, and an RSRQ greater than or equal to −15 db, then process moves from operation 618 to operation 622 where the MS cell is labeled as not interfered by external sources. Process flows from operation 622 to operation 624 where the process is ended.

In FIG. 7A, user interface 700 includes a display 702 that shows external interference for an 1800 MHz band. In some embodiments, a user is able to select an analytics selector 504 (e.g., an arrow) that, when clicked on by the user, reveals an RF (radio frequency) selector 706. In some embodiments, a user is able to click on the RF selector to reveal an interference selector 708. In some embodiments, a user is able to click on the interference selector 708 to reveal several radio frequency bands the user is able to select in order to observe the inference at these frequency bands (e.g., 1800 MHz, 2100 MHz, 800 MHz, and 2600 MHz).

In FIG. 7A 1800 MHz is selected at box 710. In some embodiments, display 502 displays each RAN's internal interference at 1800 MHz. In some embodiments, depending on the map scale, the geographic areas displayed are larger or smaller. In FIG. 7A where each inch represents 500 km, the external interference at 1800 MHz is displayed as a percentage over the area of interest (e.g., 0.02% Northern Ireland RAN 714, 0.03% in Edinburgh RAN 716, 0.05% in Manchester RAN 718, and London RAN 712 0.07%). Thus, for most of the RANs displayed in display 702, less than 0.1% of the geographical area is experiencing external interference. Nevertheless, in some embodiments, a vendor, such as service providers 116, that considers any interference over 0.05% as reducing QoE is able to drill down (e.g., reduce the map scale to zoom into a location) and find where the interference is occurring so a network engineer or network operator is able to diagnose and resolve the interference issue. In some embodiments, the percentage of interference for each RAN indicated in FIG. 7A is geo-binned to determine a mean interference over the entire RAN. For example, using Northern Ireland RAN 714, 0.02% of the grids within Northern Ireland RAN 714 are experiencing external interference at 1800 MHz.

In FIG. 7B, user interface 700 includes a display 720 that shows external interference for an 1800 MHz band where the map scale is 1 km per inch. In display 720, a user had drilled down into the London RAN 712 (FIG. 7A) region of the United Kingdom by reducing the distance scale from 500 km per inch to 1 km per inch. In some embodiments, a user (such as a network engineer or network operator) is able to reduce the scale of the map with zoom button 726 or using +/−button 728. In some embodiments, at 1 km per inch, each grid is 100 m×100 m.

In display 720 a user is able to click on legend and filter icon 722 that will open legends and filter box 721. In some embodiments, legend and filter box 721 displays a color or a shade applied to each grid to represent one of: interfering and non-interfering. In some embodiments, any geographic area not represented with a grid is considered a geographical area without network coverage at the frequency selected. Further, a user is also able to click on arrow 724 to switch between internal and external interference as well as the frequency band from the legend and filter box 721.

In FIG. 7C, user interface 700 includes a display 740. In display 740, a user is able to select any grid displayed (i.e., some geographic areas have no grids) to open callout box 742. Callout box 742 allows a user to visualize data related to a specific selected grid. A pointer on callout box 742 displays to the user the selected grid to which the information presented applies. By clicking on a grid, a user is able to obtain information about the MS cell for the grid. In FIG. 7C, the MS cell's cell ID, RSRP, median RSRP, RSRQ, and number of NS cells within the grid. In some embodiments, other information is presented within callout box 742 in accordance with some embodiments. Callout box 742 is able to assist a network engineer or network operator with evaluation of a particular grid of interest while troubleshooting network operation.

FIG. 8 is a block diagram of a Server Cell Identification (SCI) processing circuitry 800 in accordance with some embodiments. In some embodiments, SCI processing circuitry 800 is a general purpose computing device including a hardware processor 802 and a non-transitory, computer-readable storage medium 804. Storage medium 804, amongst other things, is encoded with, i.e., stores, computer program code 806, i.e., a set of executable instructions such as SCI algorithm, such as methods 400 and 600. Execution of instructions 806 by hardware processor 802 represents (at least in part) a RAN server cell identification application which implements a portion or all of the methods described herein in accordance with one or more embodiments (hereinafter, the noted processes and/or methods).

Processor 802 is electrically coupled to a computer-readable storage medium 804 via a bus 808. Processor 802 is also be electrically coupled to an I/O interface 810 by bus 808. A network interface 812 is also electrically connected to processor 802 via bus 808. Network interface 812 is connected to a network 814, so that processor 802 and computer-readable storage medium 804 are capable of connecting to external elements via network 814. Processor 802 is configured to execute computer program code 806 encoded in computer-readable storage medium 804 in order to cause unified coverage processing circuitry 800 to be usable for performing a portion or all of the noted processes and/or methods. In one or more embodiments, processor 802 is a Central Processing Unit (CPU), a multi-processor, a distributed processing system, an Application Specific Integrated Circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a Random Access Memory (RAM), a Read-Only Memory (ROM), a rigid magnetic disk, and/or an optical disk. In one or more embodiments using optical disks, computer-readable storage medium 804 includes a Compact Disk-Read Only Memory (CD-ROM), a Compact Disk-Read/Write (CD-R/W), and/or a Digital Video Disc (DVD).

In one or more embodiments, storage medium 804 stores computer program code 806 configured to cause SCI processing circuitry 800 to be usable for performing a portion or all of the noted processes and/or methods. In one or more embodiments, storage medium 804 also stores information, such as SCI algorithm which facilitates performing a portion or all of the noted processes and/or methods.

Unified coverage processing circuitry 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

SCI processing circuitry 800 also includes network interface 812 coupled to processor 802. Network interface 812 allows SCI processing circuitry 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more unified coverage processing circuitry 800.

SCI processing circuitry 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. SCI processing circuitry 800 is configured to receive information related to a UI through I/O interface 810. The information is stored in computer-readable medium 804 as User Interface (UI) 822.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a method includes: receiving inputs that include geo-located data collected over a period for a plurality of cells in a Radio Access Network (RAN); determining each cell in the plurality of cells included in each grid of a plurality of grids of a predetermined size based on the geo-located data; determining Received Signal Received Power (RSRP) values for each cell of the plurality of cells in the plurality of grids having the predetermined size; determining a median cell RSRP for each cell of a grid of the plurality of grids; determining from the geo-located data a number of data samples per cell for each of the plurality of grids having the predetermined size; determining a cell ranking for each of the plurality of cells in the plurality of grids having the predetermined size based on the number of data samples and the median cell RSRP; determining a highest-ranking cell in each of the plurality of grids based on the cell ranking; labeling the highest-ranking cell as a Main Server (MS); and labeling all other cells in a corresponding grid as a Non-Main Server (NS).

In some embodiments, the method further includes: determining whether interference in a geographic area covered by two or more cells is internal or external; labeling the interference as internal interference in response to the two or more cells being operated by a same vendor; and labeling the interference as external interference in response to the two or more cells being operated by a different vendor.

In some embodiments, the method further includes: responsive to the internal interference in the geographic area, determining whether a MS cell RSRP is less than a first threshold.

In some embodiments, the method further includes: responsive to the MS cell RSRP being less than the first threshold, labeling a grid of the plurality of grids MS as poor dominance; and responsive to the MS cell RSRP being greater than the first threshold, determining whether a difference between the MS cell RSRP and a NS RSRP is greater than a second threshold, the second threshold being smaller than the first threshold.

In some embodiments, the method further includes: responsive to the difference between the MS cell RSRP and the NS RSRP for each NS included in a grid of the plurality of grids being greater than the second threshold, labeling the grid MS as clear dominance; and responsive to the difference between the MS cell RSRP and at least one NS RSRP being less than or equal to the second threshold, determining whether four or more NS cells satisfy a same condition.

In some embodiments, the method further includes: responsive to the four or more NS cells satisfying a condition where the difference between the MS cell RSRP and the NS RSRP is less than or equal to the second threshold, labeling the four or more NS cells as a critical interferer; and responsive to less than four NS cells satisfying the condition where the difference between the MS cell RSRP and the NS RSRP is less than or equal to the second threshold, determining whether three or more NS cells satisfy the condition where the difference between the MS cell RSRP and the NS RSRP is less than or equal to a third threshold, the third threshold being less than or equal to the second threshold.

In some embodiments, the method further includes: responsive to the three or more NS cells satisfying the condition where the difference between the MS cell RSRP and the NS RSRP is less than or equal to the third threshold, labeling the three or more NS cells with an interferer warning; and responsive to less than the three NS cells satisfying the condition where the difference between the MS cell RSRP and the NS RSRP is less than or equal to the third threshold, labeling NS cells satisfying the condition where the difference between the MS cell RSRP and the NS RSRP is greater than the third threshold as a handover area.

In some embodiments, the method further includes: responsive to the external interference in the geographic area, extracting median MS RSRP and median MS Received Signal Received Quality (RSRQ) values for each grid of the plurality of grids from the geo-located data.

In some embodiments, the method further includes: determining whether the median MS RSRP is greater than a first threshold and the median MS RSRQ is less than or equal to a second threshold, the first threshold being greater than the second threshold.

In some embodiments, the method further includes: responsive to the median MS RSRP being greater than the first threshold and the median MS RSRQ being less than or equal to the second threshold, labeling a grid MS as interfered by an external source.

In some embodiments, the method further includes: responsive to the median MS RSRP being less than the first threshold and the median MS RSRQ being greater than the second threshold, labeling a grid MS as not interfered by an external source.

In some embodiments, an apparatus, includes: a processor; and a memory having instructions stored thereon that, when executed by the processor, cause the apparatus to: receive inputs that include geo-located data collected over a period for a plurality of cells in a Radio Access Network (RAN); determine each cell in the plurality of cells included in each grid of a plurality of grids of a predetermined size based on the geo-located data; determine Received Signal Received Power (RSRP) values for each cell of the plurality of cells in the plurality of grids having a predetermined size; determine a median cell RSRP for each cell of a grid of the plurality of grids; determine from the geo-located data a number of data samples per cell for each of the plurality of grids having the predetermined size; determine a cell ranking for each of the plurality of cells in the plurality of grids having the predetermined size based on the number of data samples and the median cell RSRP; determine a highest-ranking cell in each of the plurality of grids based on the cell ranking; label the highest-ranking cell as a Main Server (MS); and label all other cells in a corresponding grid as a Non-Main Server (NS).

In some embodiments, the apparatus wherein the instructions further cause the apparatus to: determine whether interference in a geographic area covered by two or more cells is internal or external; label the interference as internal interference in response to the two or more cells are operated by a same vendor; and label the interference as external interference in response to the two or more cells being operated by a different vendor.

In some embodiments, the apparatus wherein the instructions further cause the apparatus to: responsive to the internal interference in the geographic area, determine whether a MS cell RSRP is less than a first threshold.

In some embodiments, the apparatus wherein the instructions further cause the apparatus to: responsive to the MS cell RSRP being less than the first threshold, label a grid of the plurality of grids MS as poor dominance; and responsive to the MS cell RSRP being greater than the first threshold, determining whether a difference between the MS cell RSRP and a NS RSRP is greater than a second threshold, the second threshold being smaller than the first threshold.

In some embodiments, a non-transitory computer readable medium having instructions stored thereon that, when executed by a processor, cause an apparatus to: receive inputs that include geo-located data collected over a period for a plurality of cells in a Radio Access Network (RAN); determine each cell in the plurality of cells included in each grid of a plurality of grids of a predetermined size based on the geo-located data; determine Received Signal Received Power (RSRP) values for each cell of the plurality of cells in the plurality of grids having the predetermined size; determine a median cell RSRP for each cell of a grid of the plurality of grids; determine from the geo-located data a number of data samples per cell for each of the plurality of grids having the predetermined size; determine a cell ranking for each of the plurality of cells in the plurality of grids having the predetermined size based on the number of data samples and the median cell RSRP; determine a highest-ranking cell in each of the plurality of grids based on the cell ranking; label the highest-ranking cell as a Main Server (MS); and label all other cells in a corresponding grid as a Non-Main Server (NS).

In some embodiments, the non-transitory computer readable medium wherein the instructions further cause the processor to: determine whether interference in a geographic area covered by two or more cells is internal or external; label the interference as internal interference in response to the two or more cells are operated by a same vendor; and label the interference as external interference in response to the two or more cells being operated by a different vendor.

In some embodiments, the non-transitory computer readable medium wherein the instructions further cause the processor to: responsive to the external interference in the geographic area, extract the median RSRP and median Received Signal Received Quality (RSRQ) values for the MS cell of each grid of the plurality of grids from the geo-located data.

In some embodiments, the non-transitory computer readable medium wherein the instructions further cause the processor to: determine whether the median MS RSRP is greater than a first threshold and the median MS RSRQ is less than or equal to a second threshold.

In some embodiments, the non-transitory computer readable medium of claim 19, wherein the instructions further cause the processor to: responsive to the median MS RSRP being greater than the first threshold and the median MS RSRQ being less than or equal to the second threshold, label the MS cell as interfered by an external source.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method of serving cell identification, the method comprising:
   receiving inputs that include geo-located data collected over a period for a plurality of cells in a Radio Access Network (RAN);
   determining each cell of the plurality of cells included in each grid of a plurality of grids of a predetermined size based on the geo-located data;
   determining Received Signal Received Power (RSRP) values for each cell of the plurality of cells in the plurality of grids having the predetermined size;
   determining a median cell RSRP for each cell of a grid of the plurality of grids;
   determining from the geo-located data a number of data samples per cell for each of the plurality of grids having the predetermined size;

determining a cell ranking for each of the plurality of cells in the plurality of grids having the predetermined size based on the number of data samples and the median cell RSRP;

determining a highest-ranking cell in each of the plurality of grids based on the cell ranking;

labeling the highest-ranking cell as a Main Server (MS);

labeling all other cells in a corresponding grid as a Non-Main Server (NS);

responsive to internal interference in the geographic area, determining whether a MS cell RSRP is less than a first threshold;

responsive to the MS cell RSRP being less than the first threshold, labeling a grid of the plurality of grids MS as poor dominance; and responsive to the MS cell RSRP being greater than the first threshold, determining whether a difference between the MS cell RSRP and a NS RSRP is greater than a second threshold, the second threshold being smaller than the first threshold.

2. The method of serving cell identification of claim 1, further comprising:

determining whether interference in a geographic area covered by two or more cells is internal or external;

labeling the interference as the internal interference in response to the two or more cells being operated by a same vendor; and labeling the interference as external interference in response to the two or more cells being operated by a different vendor.

3. The method of serving cell identification of claim 1, further comprising:

responsive to the difference between the MS cell RSRP and the NS RSRP for each NS included in a grid of the plurality of grids being greater than the second threshold, labeling the grid MS as clear dominance; and responsive to the difference between the MS cell RSRP and at least one NS RSRP being less than or equal to the second threshold, determining whether four or more NS cells satisfy a same condition.

4. The method of serving cell identification of claim 3, further comprising:

responsive to the four or more NS cells satisfying a condition where the difference between the MS cell RSRP and the NS RSRP is less than or equal to the second threshold, labeling the four or more NS cells as a critical interferer; and responsive to less than four NS cells satisfying the condition where the difference between the MS cell RSRP and the NS RSRP is less than or equal to the second threshold, determining whether three or more NS cells satisfy the condition where the difference between the MS cell RSRP and the NS RSRP is less than or equal to a third threshold, the third threshold being less than or equal to the second threshold.

5. The method of serving cell identification of claim 4, further comprising:

responsive to the three or more NS cells satisfying the condition where the difference between the MS cell RSRP and the NS RSRP is less than or equal to the third threshold, labeling the three or more NS cells with an interferer warning; and responsive to less than the three NS cells satisfying the condition where the difference between the MS cell RSRP and the NS RSRP is less than or equal to the third threshold, labeling NS cells satisfying the condition where the difference between the MS cell RSRP and the NS RSRP is greater than the third threshold as a handover area.

6. The method of serving cell identification of claim 1, further comprising:

responsive to the external interference in the geographic area, extracting median MS RSRP and median MS Received Signal Received Quality (RSRQ) values for each grid of the plurality of grids from the geo-located data.

7. The method of serving cell identification of claim 6, further comprising:

determining whether the median MS RSRP is greater than a first threshold and the median MS RSRQ is less than or equal to a second threshold, the first threshold being greater than the second threshold.

8. The method of serving cell identification of claim 7, further comprising:

responsive to the median MS RSRP being greater than the first threshold and the median MS RSRQ being less than or equal to the second threshold, labeling a grid MS as interfered by an external source.

9. The method of serving cell identification of claim 7, further comprising:

responsive to the median MS RSRP being less than the first threshold and the median MS RSRQ being greater than the second threshold, labeling a grid MS as not interfered by an external source.

10. An apparatus for serving cell identification, the apparatus comprising:

a processor; and a memory having instructions stored thereon that, when executed by the processor, cause the apparatus to:

receive inputs that include geo-located data collected over a period for a plurality of cells in a Radio Access Network (RAN);

determine each cell in the plurality of cells included in each grid of a plurality of grids of a predetermined size based on the geo-located data;

determine Received Signal Received Power (RSRP) values for each cell of the plurality of cells in the plurality of grids having a predetermined size;

determine a median cell RSRP for each cell of a grid of the plurality of grids;

determine from the geo-located data a number of data samples per cell for each of the plurality of grids having the predetermined size;

determine a cell ranking for each of the plurality of cells in the plurality of grids having the predetermined size based on the number of data samples and the median cell RSRP;

determine a highest-ranking cell in each of the plurality of grids based on the cell ranking;

label the highest-ranking cell as a Main Server (MS);

label all other cells in a corresponding grid as a Non-Main Server (NS);

responsive to internal interference in the geographic area, determine whether a MS cell RSRP is less than a first threshold;

responsive to the MS cell RSRP being less than the first threshold, label a grid of the plurality of grids MS as poor dominance; and responsive to the MS cell RSRP being greater than the first threshold, determining whether a difference between the MS cell RSRP and a NS RSRP is greater than a second threshold, the second threshold being smaller than the first threshold.

11. The apparatus for serving cell identification of claim 10, wherein the instructions further cause the apparatus to:
- determine whether interference in a geographic area covered by two or more cells is internal or external;
- label the interference as the internal interference in response to the two or more cells are operated by a same vendor; and
- label the interference as external interference in response to the two or more cells being operated by a different vendor.

12. A non-transitory computer readable medium having instructions stored thereon that, when executed by a processor, cause an apparatus to:
- receive inputs that include geo-located data collected over a period for a plurality of cells in a Radio Access Network (RAN);
- determine each cell in the plurality of cells included in each grid of a plurality of grids of a predetermined size based on the geo-located data;
- determine Received Signal Received Power (RSRP) values for each cell of the plurality of cells in the plurality of grids having the predetermined size;
- determine a median cell RSRP for each cell of a grid of the plurality of grids;
- determine from the geo-located data a number of data samples per cell for each of the plurality of grids having the predetermined size;
- determine a cell ranking for each of the plurality of cells in the plurality of grids having the predetermined size based on the number of data samples and the median cell RSRP;
- determine a highest-ranking cell in each of the plurality of grids based on the cell ranking;
- label the highest-ranking cell as a Main Server (MS);
- label all other cells in a corresponding grid as a Non-Main Server (NS);
- responsive to internal interference in the geographic area, determine whether a MS cell RSRP is less than a first threshold;
- responsive to the MS cell RSRP being less than the first threshold, label a grid of the plurality of grids MS as poor dominance; and
- responsive to the MS cell RSRP being greater than the first threshold, determining whether a difference between the MS cell RSRP and a NS RSRP is greater than a second threshold, the second threshold being smaller than the first threshold.

13. The non-transitory computer readable medium of claim 12, wherein the instructions further cause the processor to:
- determine whether interference in a geographic area covered by two or more cells is internal or external;
- label the interference as the internal interference in response to the two or more cells are operated by a same vendor; and
- label the interference as external interference in response to the two or more cells being operated by a different vendor.

14. The non-transitory computer readable medium of claim 13, wherein the instructions further cause the processor to:
- responsive to the external interference in the geographic area, extract the median RSRP and median Received Signal Received Quality (RSRQ) values for the MS cell of each grid of the plurality of grids from the geo-located data.

15. The non-transitory computer readable medium of claim 14, wherein the instructions further cause the processor to:
- determine whether the median MS RSRP is greater than a first threshold and the median MS RSRQ is less than or equal to a second threshold.

16. The non-transitory computer readable medium of claim 15, wherein the instructions further cause the processor to:
- responsive to the median MS RSRP being greater than the first threshold and the median MS RSRQ being less than or equal to the second threshold, label the MS cell as interfered by an external source.

* * * * *